(12) United States Patent
Shreevastav et al.

(10) Patent No.: US 12,381,686 B2
(45) Date of Patent: Aug. 5, 2025

(54) SIGNALLING SUPPORT FOR NR POSITIONING WITH APERIODIC SRS CONFIGURATIONS

(71) Applicant: Telefonaktiebolaget LM Ericsson (publ), Stockholm (SE)

(72) Inventors: Ritesh Shreevastav, Upplands Väsby (SE); Gino Luca Masini, Stockholm (SE); Iana Siomina, Täby (SE); Per Ernström, Stockholm (SE); Åke Busin, Sollentuna (SE); Florent Munier, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/603,335

(22) Filed: Mar. 13, 2024

(65) Prior Publication Data
US 2024/0305428 A1 Sep. 12, 2024

Related U.S. Application Data

(63) Continuation of application No. 17/775,006, filed as application No. PCT/SE2020/051073 on Nov. 6, 2020, now Pat. No. 11,985,091.

(60) Provisional application No. 62/932,094, filed on Nov. 7, 2019.

(51) Int. Cl.
*H04L 5/00* (2006.01)
(52) U.S. Cl.
CPC .......... *H04L 5/0051* (2013.01); *H04L 5/0094* (2013.01)

(58) Field of Classification Search
None
See application file for complete search history.

(56) References Cited

U.S. PATENT DOCUMENTS

| | | | |
|---|---|---|---|
| 2017/0288897 A1 | 10/2017 | You et al. | |
| 2019/0190669 A1* | 6/2019 | Park | H04W 72/21 |
| 2019/0215780 A1 | 7/2019 | Lee et al. | |
| 2019/0349964 A1* | 11/2019 | Liou | H04B 7/0626 |

(Continued)

FOREIGN PATENT DOCUMENTS

| | | |
|---|---|---|
| CN | 102771171 A | 11/2012 |
| CN | 110168947 A | 8/2019 |
| CN | 112583563 A | 3/2021 |

OTHER PUBLICATIONS

Khoryaev, Alexey, et al., "Signaling Procedures for NR Positioning Support", U.S. Appl. No. 62/791,469, filed Jan. 11, 2019, 1-83.

(Continued)

*Primary Examiner* — Diane L Lo
(74) *Attorney, Agent, or Firm* — Murphy, Bilak & Homiller, PLLC

(57) ABSTRACT

Embodiments described herein relate to methods and apparatus in networks, and particularly methods, Location Management Functions, base stations and wireless devices for configuring and sending uplink sounding reference signals (UL SRS). An example method performed by a Location Management Function (LMF) comprises receiving radio resource information relating to radio resources that can be applied for UL SRS by a wireless device; and providing a notification relating to triggering aperiodic uplink SRS to a base station serving the wireless device.

16 Claims, 20 Drawing Sheets

(56) References Cited

U.S. PATENT DOCUMENTS

| | | |
|---|---|---|
| 2020/0106646 A1* | 4/2020 | Liu .................. H04L 1/0013 |
| 2020/0137715 A1* | 4/2020 | Edge .................. G01S 5/10 |
| 2020/0368576 A1 | 11/2020 | Mckee |
| 2021/0058910 A1* | 2/2021 | Yokomakura ......... H04L 5/0048 |
| 2022/0110085 A1 | 4/2022 | Khoryaev et al. |
| 2022/0116882 A1 | 4/2022 | Guo |
| 2022/0236366 A1 | 7/2022 | Cha et al. |

OTHER PUBLICATIONS

Unknown, Author, "3rd Generation Partnership Project; Technical Specification Group Radio Access Network; NR; Multiplexing and channel coding (Release 15)", 3GPP TS 38.212 V15.7.0, Sep. 2019, pp. 1-101.

Unknown, Author, "Offline notes #3 for 7.2.10.2 UL Reference Signals for NR Positioning", 3GPP TSG-RAN WG1 Meeting #98bis, R1-1911640, Chongqing, P.R. China, Oct. 14-20, 2019, 1-22.

Unknown, Author, "UL Reference Signals for NR Positioning", 3GPP TSG RAN WG1 Meeting #98bis, R1-1910319, Chongqing, China, Oct. 14-20, 2019, 1-7.

\* cited by examiner

SIGNALLING SUPPORT FOR NR POSITIONING WITH APERIODIC SRS CONFIGURATIONS

TECHNICAL FIELD

Embodiments of the present disclosure relate to methods and apparatus in networks, and particularly methods, Location Management Functions, base stations and wireless devices for configuring and sending uplink sounding reference signals, UL SRS.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Positioning, in the sense of locating devices, has been a topic in Long Term Evolution (LTE) standardization since $3^{rd}$ Generation Partnership Project (3GPP) Release 9. The primary objective is to fulfill regulatory requirements for emergency call positioning. Positioning in New Radio (NR) is proposed to be supported by the architecture shown in FIG. 1. Location Management Function (LMF) is the location node in NR, and may be a core network node. There are also interactions between the location node and the gNodeB via the New Radio Positioning Protocol A (NRPPa) protocol. The interactions between the gNodeB and the device is supported via the Radio Resource Control (RRC) protocol. In FIG. 1, the AMF is the application management function, and the UE is a user equipment (also referred to using the term wireless device herein).

With reference to FIG. 1, the gNB and ng-eNB may not always both be present. Further, in the event that both the gNB and ng-eNB are present, the NG-C interface is typically only present for one of them.

In the legacy LTE standards, the following positioning techniques are supported:
Enhanced Cell ID. Essentially cell ID information to associate the device to the serving area of a serving cell, and then additional information to determine a finer granularity of position.
Assisted Global Navigational Satellite System (GNSS). GNSS information retrieved by the device, supported by assistance information provided to the device from an evolved serving mobile location centre (E-SMLC)
OTDOA (Observed Time Difference of Arrival). The device estimates the time difference of reference signals from different base stations and sends to the E-SMLC for multi-lateration
UTDOA (Uplink TDOA). The device is requested to transmit a specific waveform that is detected by multiple location measurement units (e.g. an eNB) at known positions. These measurements are forwarded to E-SMLC for multilateration With reference to NR positioning for Rel. 16; the 3GPP NR radio-technology is uniquely positioned to provide added value in terms of enhanced location capabilities. The operation in low and high frequency bands (i.e. below and above 6 GHz) and utilization of massive antenna arrays provides additional degrees of freedom to substantially improve the positioning accuracy. The possibility to use wide signal bandwidth in low and especially in high bands brings new performance bounds for user location for well-known positioning techniques based OTDOA and UTDOA, Cell-ID or E-Cell-ID etc., utilizing timing measurements to locate UE. The recent advances in massive antenna systems (massive multi-input multi-output, MIMO) can provide additional degrees of freedom to enable more accurate user location by exploiting spatial and angular domains of propagation channel in combination with time measurements.

With 3GPP Release 9 Positioning Reference Signals (PRS) have been introduced for antenna port 6 for OTDOA since the Release 8 cell-specific reference signals were found to be not sufficient for OTDOA positioning. The Release 8 cell-specific reference signals were found to be not sufficient because the required high probability of detection could not be guaranteed. A neighbor cell with its synchronization signals (Primary-/Secondary Synchronization Signals, P/SSS) and reference signals is seen as detectable when the Signal-to-Interference-and-Noise Ratio (SINR) is at least −6 dB. Simulations during standardization have shown, that this can be only guaranteed for 70% of all cases for the 3rd best-detected cell (that is, the 2nd best neighboring cell when the serving cell is taken into account). The value of 70% may not be considered enough, and this value has been derived assuming an interference-free environment, which cannot be ensured in a real-world scenario. However, PRS have still some similarities with cell-specific reference signals as defined in 3GPP Release 8. It is a pseudo-random Quadrature Phase Shift Keying (QPSK) sequence that is being mapped in diagonal patterns with shifts in frequency and time to avoid collision with cell-specific reference signals and an overlap with the control channels (such as the physical downlink control channel, PDCCH).

In NR, PRS signal design is ongoing. A new PRS signal has been defined for NR for downlink (DL) TDOA and which can be also used for round trip time (RTT) and Angle based positioning methods such as Angle of Arrival (AoA). For uplink (UL), it would be modification of existing UL sounding reference signal (SRS) to be used for UTDOA, multi-cell RTT, and AoA computation. The Rel-15 SRS is transmitted in UL to perform channel state indicator (CSI) measurements mainly for scheduling and link adaptation. The Rel-16 SRS enhancements made may be suitable for positioning purposes.

UL SRS may be configured either:
a) Periodically (which may be with a defined period upon which the UL SRS is sent)
b) Semi-Persistent (that is, semi-dynamically, which may be with a defined period for a certain period of time)
c) Aperiodic (dynamically, which may be without a defined period).

For Aperiodic UL SRS transmission, below 4 DCI code points are available. This is discussed in greater detail in TS 38.212 v15.7.0, from which table 7.3.1.1.2-24 below is taken.

TABLE 7.3.1.1.2-24

| | SRS request | |
|---|---|---|
| Value of SRS request field | Triggered aperiodic SRS resource set(s) for DCI format 0_1, 1_1, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
| 00 | No aperiodic SRS resource set triggered | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 | SRS resource set(s) configured with higher layer parameter usage in SRS-ResourceSet set to 'antennaSwitching' and resourceType in SRS-ResourceSet set to 'aperiodic' for a $1^{st}$ set of serving cells configured by higher layers |
| 10 | SRS resource set(s) configured with higher layer parameter aperiodicSRS-ResourceTrigger set to 2 or an entry in aperiodicSRS-ResourceTriggerList set to 2 | SRS resource set(s) configured with higher layer parameter usage in SRS-ResourceSet set to 'antennaSwitching' and resourceType in SRS-ResourceSet set to 'aperiodic' for a $2^{nd}$ set of serving cells configured by higher layers |
| 11 | SRS resource set(s) configured with higher layer parameter aperiodicSRS-ResourceTrigger set to 3 or an entry in aperiodicSRS-ResourceTriggerList set to 3 | SRS resource set(s) configured with higher layer parameter usage in SRS-ResourceSet set to 'antennaSwitching' and resourceType in SRS-ResourceSet set to 'aperiodic' for a $3^{rd}$ set of serving cells configured by higher layers |

There currently exist certain challenge(s). Periodic SRS configuration has been supported for positioning in the LTE. However, the semi-persistent and aperiodic are new agreements applicable for NR Positioning, and are not historically supported. That is, the sequence of events and required signaling for uplink based positioning methods using UL SRS for semi-persistent and aperiodic schemes have not been defined.

For DL PRS, configurations may be provided by LMF to the UE whereas for UL SRS there is no defined system for providing the configuration. Some potential options for providing the configuration include RRC (supported by a gNB) and/or LTE positioning protocol (LPP) (supported by a LMF).

TS 38.212 v15.7.0, available at https://portal.3gpp.org/as of 30 Oct. 2020, provides details on the coding, multiplexing and mapping to physical channels used in 5G NR.

SUMMARY

It is an object of the present disclosure to provide methods and apparatus for configuring UL SRS which allow one or more of dynamic SRS configuration, configuration based on positioning needs and requirements, and reduced SRS configuration signaling resource consumption.

Embodiments of the disclosure aim to provide apparatus and methods that alleviate some or all of the challenges identified herein.

An aspect of an embodiment of the disclosure provides a method for configuring uplink sounding reference signals, UL SRS, the method comprising, by a Location Management Function, LMF: receiving radio resource information relating to radio resources that can be applied for UL SRS by a wireless device; and providing a notification relating to triggering aperiodic uplink SRS to a base station serving the wireless device.

A further aspect of an embodiment of the disclosure provides a method for configuring uplink sounding reference signals, UL SRS, the method comprising, by a base station: receiving a notification relating to triggering aperiodic uplink SRS from a Location Management Function, LMF; determining an UL SRS configuration for a wireless device served by the base station; and causing the UL SRS configuration to be transmitted to the wireless device.

A further aspect of an embodiment of the disclosure provides a method performed by a wireless device for sending uplink sounding reference signals, UL SRS, the method comprising: receiving an uplink SRS configuration; configuring the wireless device based on the uplink SRS configuration; and causing an uplink SRS to be transmitted.

Further aspects of embodiments of the disclosure provide LMFs, base stations and wireless devices configured to perform methods as disclosed herein.

BRIEF DESCRIPTION OF THE FIGURES

For better understanding of the present disclosure, and to show how it may be put into effect, reference will now be made, by way of example only, to the accompanying drawings, in which.

DETAILED DESCRIPTION

Certain aspects of the present disclosure and their embodiments may provide solutions to these or other challenges. Aspects of embodiments may provide mechanisms for dynamically (aperiodic) or semi-dynamically (semi-persistently) triggering the UL reference signal configuration for positioning. An example of UL signal is SRS. Aspects of embodiments may therefore provide signaling support for positioning utilizing aperiodic UL SPS.

Figure 1:
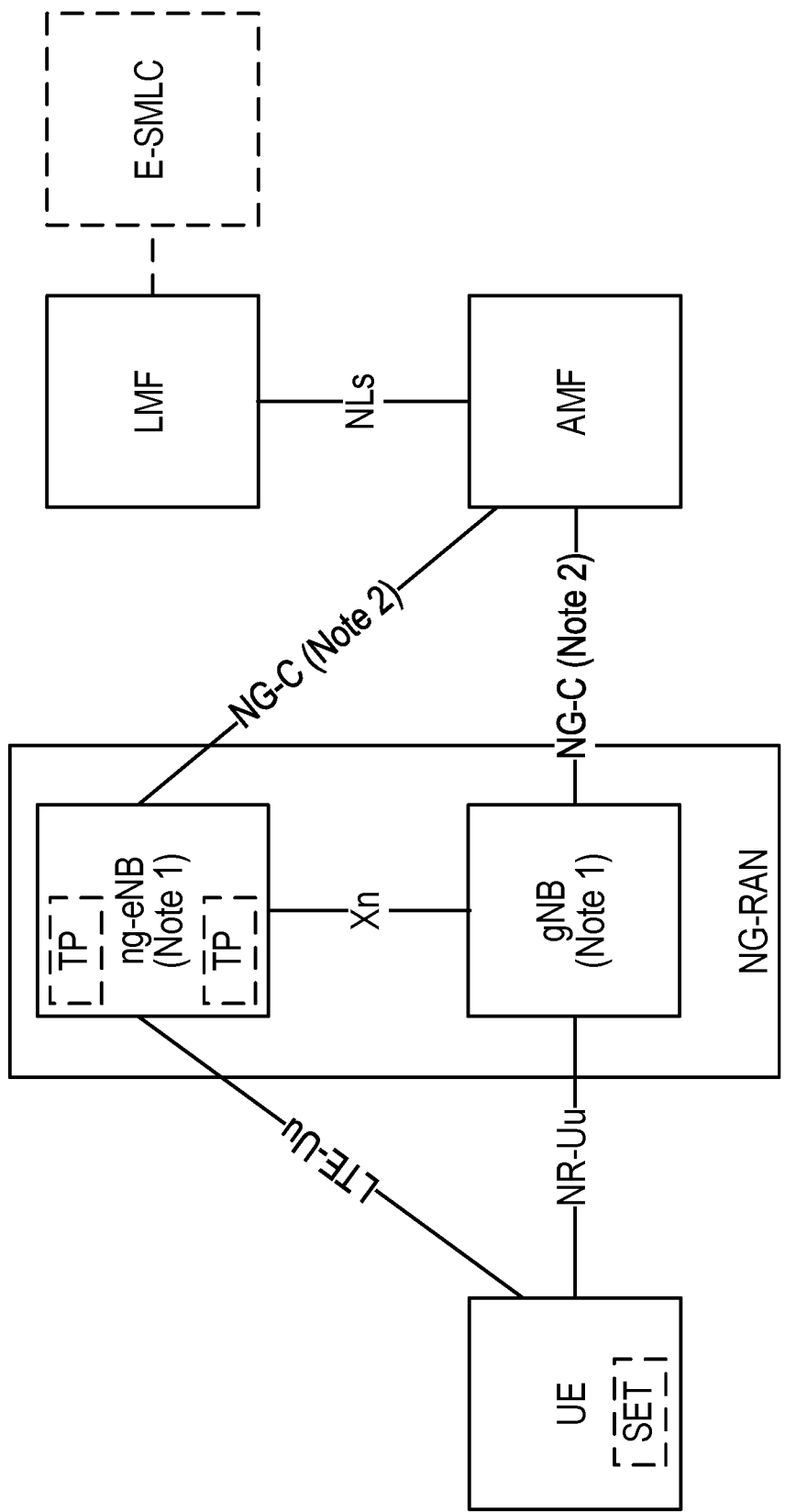
FIG. 1 is a diagram of NG-RAN Rel-15 LCS Protocols.
Figure 2A:
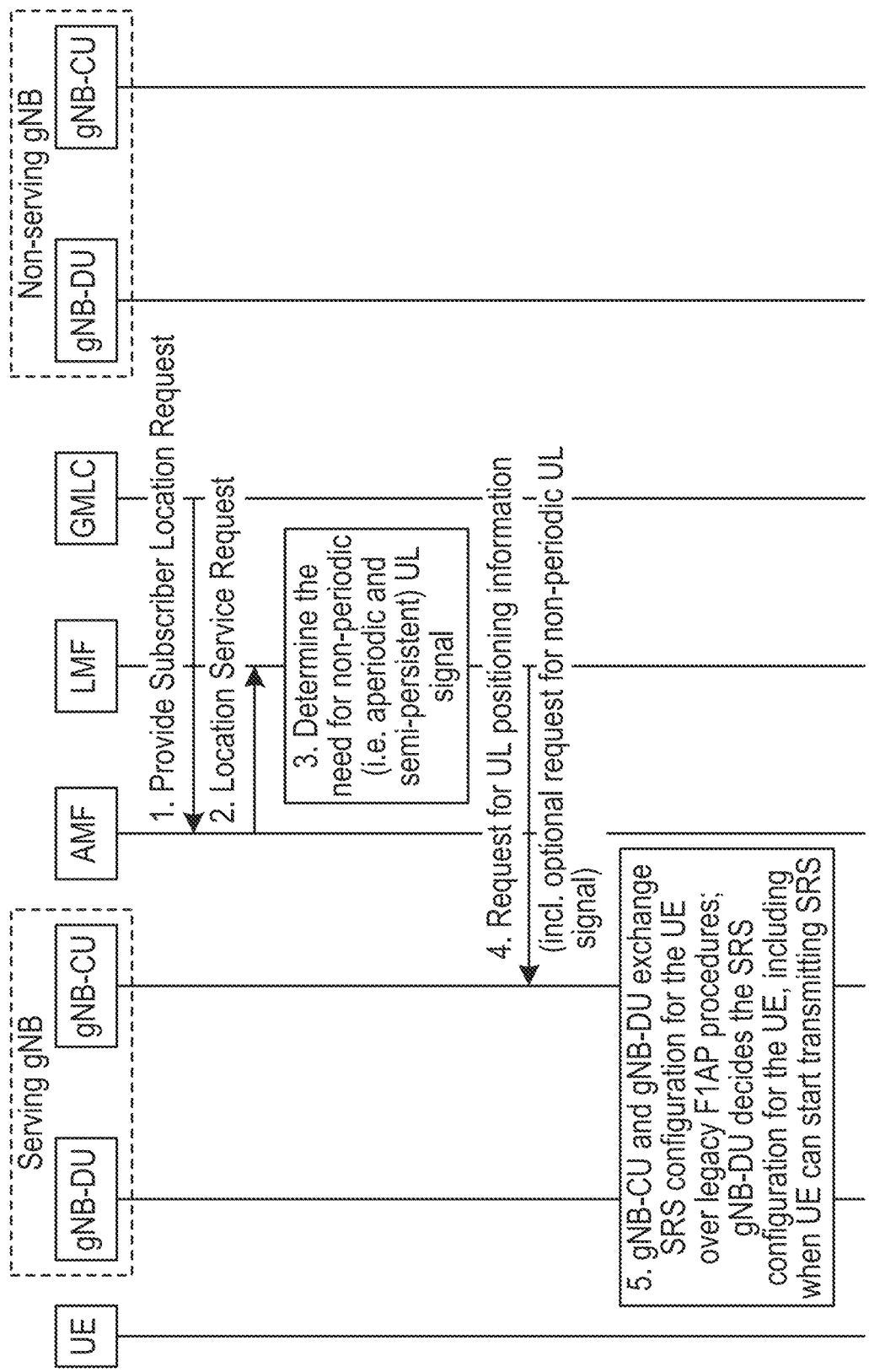
FIG. 2A-C is an example of a sequence flow for UL SRS in accordance with some embodiments.
Figure 2B:
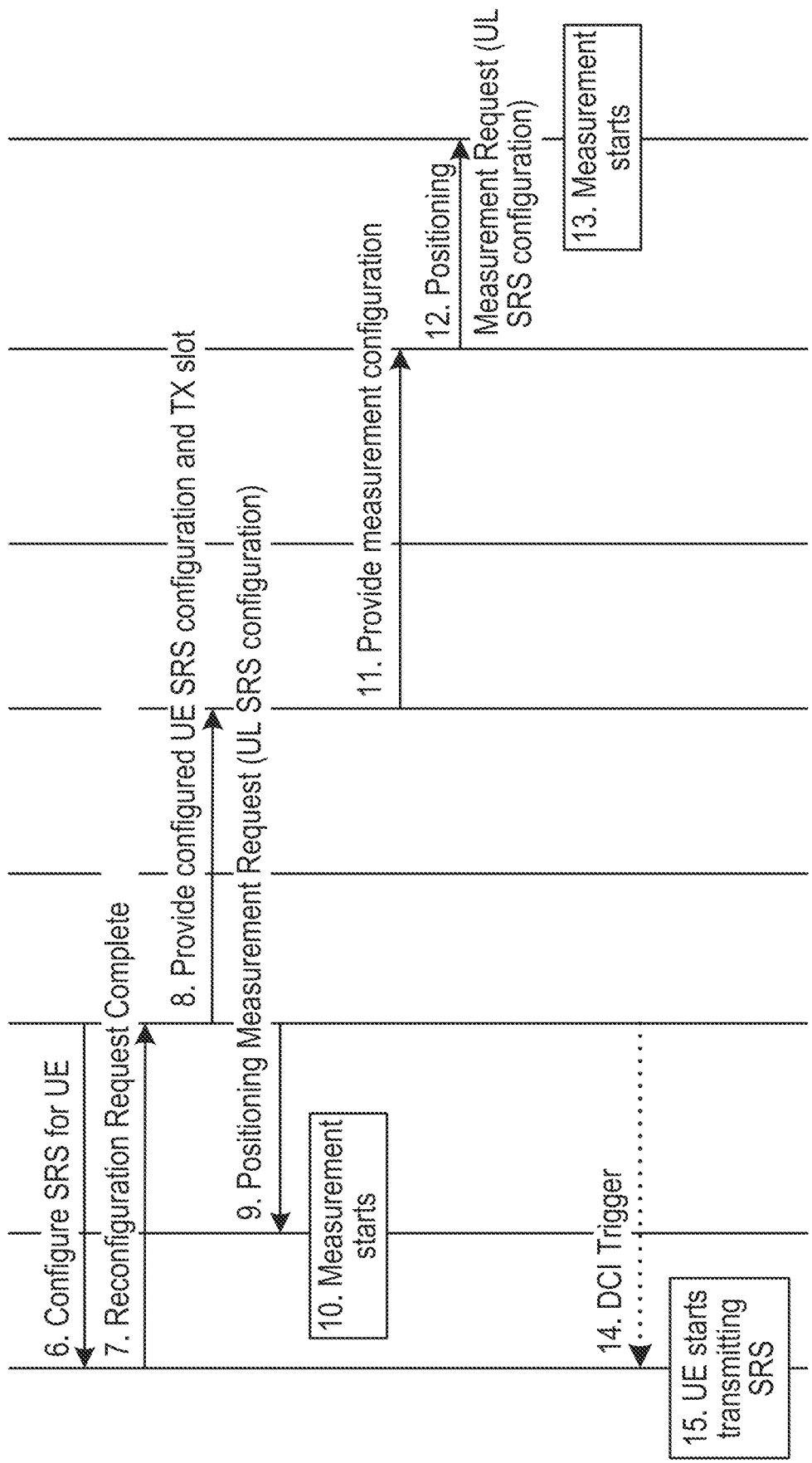
Figure 2C:
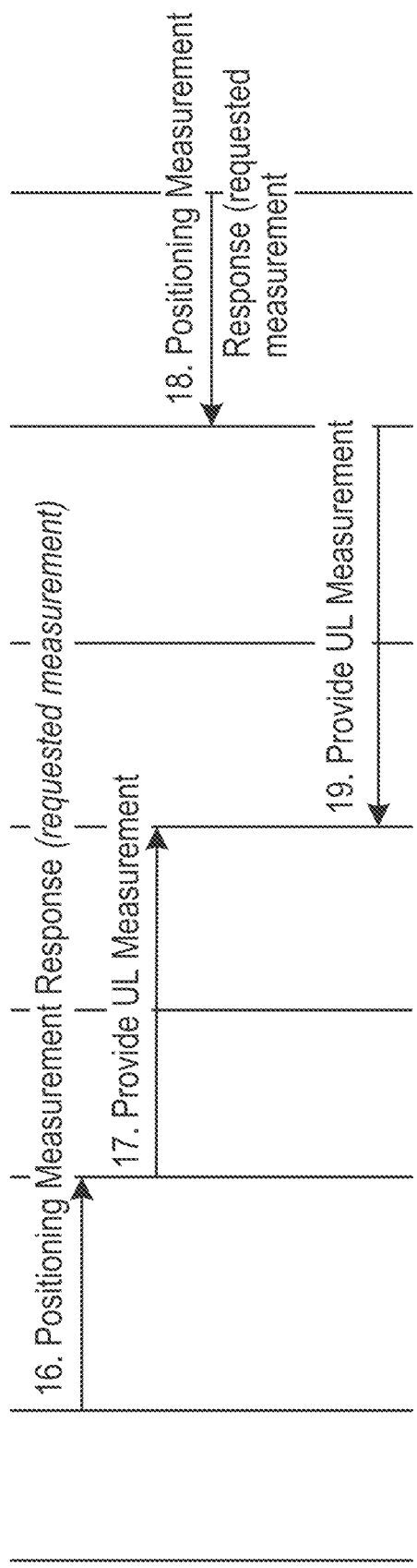

A non-limiting example of the sequence flow (Signaling) for UL SRS is provided in FIG. 2.

There are, proposed herein, various embodiments which address one or more of the issues disclosed herein.

An embodiment provides a method performed by a wireless device for uplink signaling for positioning determination, the method comprising: receiving an uplink signal configuration; configuring the wireless device based on the uplink signal configuration; and causing an uplink reference signal to be transmitted. The wireless device may be configured to cause the uplink reference signal (which may be an SRS) to be transmitted non-periodically, which may save wireless device battery power and make available additional transmission resources relative to periodic transmission. Also, the signaling resources may be selected based on positioning needs and requirements of the network.

An embodiment provides a method for configuring an uplink reference signal for positioning determination, the method comprising, by a base station: receiving a notification relating to uplink signaling; determining an uplink signal configuration; and causing the uplink signal configuration to be transmitted. The base station may tailor the uplink signal configuration taking into account network conditions, wireless device capabilities and so on, and may therefore facilitate positioning without wastage of transmission resources. Further, the timing of the uplink reference signal may be determined to avoid missed signals by RPs, and maximise positioning determination efficiency.

Certain embodiments may provide one or more of the following technical advantage(s):

Enabling Dynamic SRS configuration

Allowing selection of UL SRS Resource based upon positioning need and requirements.

A gNB which owns the radio resource may perform the configuration and provide to the UE and LMF Low overhead in SRS configuration signaling.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Location Management Function, LMF

A LMF may be hosted in a location node, which may be a core network node or another network node.

In aspects of embodiments, when a LMF determines that a notification relating to uplink signaling should be sent to a BS (for example, following a location service request from an AMF), the LMF may send a notification.

In aspects of embodiments a LMF may determine the supported set of UL reference signals (e.g., SRS) configurations for positioning, which may be non-periodic. The determination may be made based on any suitable information, such as a pre-defined table, one or more pre-defined rules, message from BS, message from UE, related BS capability, related UE capability, etc.

In an aspect of an embodiment, the LMF receives the radio resources that can be applied for UL SRS from one or more base stations. This includes the supported Downlink Control Indicator, DCI, code points and the corresponding resources associated with the DCI code points. Each base station may consider also UE capabilities and what UE/base station supports provides the desirable configuration for UL SRS transmission.

In aspects of embodiments, the LMF may receive the request for positioning from AMF for a particular UE.

In aspects of embodiments the LMF may, depending upon one or more factors such as:
- Target Quality of Service, QoS, for positioning involving the UL signals
- Type of Positioning Application: Long Periodically occurring, short periodically occurring or impulse nature, commercial or emergency
- Base station resources available, including capability and desirable UL signal configurations
- UE capability related to UL signal configuration
- UE power/energy situation (e.g., whether UE operates in low-power mode or the battery is at a low level, etc.)
- Environment type (e.g., indoor or outdoor, LOS or multipath, etc.), in the vicinity of a wireless device and/or base station and/or core network node (which may be hosting the LMF or not)

determines whether a non-periodic (aperiodic or semi-persistent) configuration is desirable, and sends to BS a request to configure/trigger in the UE non-periodic UL reference signal or sends an indication of the need for non-periodic UL reference signal.

In aspects of embodiments, the LMF may further recommend to a BS one or more preferred non-periodic configurations which may comprise DCI code points associated with the UL signal configurations that can be triggered by DCI. In another example, LMF may indicate the "amount" of UL signal needed (e.g., 0 or "high" may be understood by BS as a large Bandwidth (BW) and/or more symbols and/or higher RE density, while 1 or "low" may be understood by BS as smaller BW and fewer symbols and smaller RE density). The "amount" may be considered in terms of bandwidth, number of symbols and/or resource element density requirements.

Further, in aspects of embodiments, the LMF determines which SRS configuration is suitable for a UE based upon a metric SRS-Quality. This metric is associated with the UE UL SRS transmission power, Bandwidth and number of SRS symbols or SRS occasions (or groups of symbols). The association may be, e.g., via a table or a function F(*) such that:

SRS-Q=F(Power,BW,numberOfSRSoccations,numberOfSRSSymbols, . . . ).

Function F(*) can be, e.g., in linear or logarithmic scale.

In one example, F(*)=Power*BW_in_PRBs*numberOfSRSoccations*numberOfSRSSymbols.

In another example, F(*) is based on a table where the parameters can be values and/or ranges (e.g., BW>50 PRBs):
0=<power_level_0, BW0, N0 number of SRS occasions, S0 number of SRS symbols, etc.>
1=<power_level_1, BW1, N1 number of SRS occasions, S1 number of SRS symbols, etc.>
. . . .

In another example:
F(*)=
BW_in_PRBs*number_of_REs_per_PRB_symbol*number_of_symbols*number_of_occasions The metric SRS-Q may be sent to the base station which can then translate it into an appropriate UL signal resource configuration. The base station may cause a confirmation message to be sent to the location management function following the reception of a notification relating to uplink signaling. The confirmation may include the timing for the uplink reference signal.

Base Station, BS

In aspects of embodiments a base station upon receiving a notification relating to uplink signaling such as a request or indication (for example, from a LMF), determines a non-periodic UL signal configuration, configures the determined configuration in the UE (e.g., via RRC and/or DCI). In aspects of embodiments, the base station may send the determined configuration to LMF (which may further send it to receiving nodes such as LMUs or gNB-DU) or elsewhere.

In aspects of embodiments, the UE may be configured to start transmitting an uplink reference signal before a BS sends the UL configuration to LMF, for example, as soon as the UE has applied the UL signal configuration. A BS may control the time instance when UE should start transmitting UL reference signals (e.g. SRS). It is helpful to ensure that UL signals are not transmitted too early (because of UE power consumption and waste of UL resources) before the receiving nodes are ready to receive them and not transmitted too late so that the receiving nodes are not ready to receive. A BS may thus delay the UL signal transmission by the UE by a certain time DeltaT controlled according to the above. DeltaT may also be signaled to LMF.

The decision on the UL signal transmission start time instance may be based on one or more parameters, e.g.:
- Delay in propagating the info to LMF via NRPPa and for the LMF to inform the listening Reception points (gNB-DU) regarding the listening time instances (e.g., longer DeltaT for a longer delay, shorter DeltaT for a shorter delay)
- Any ongoing activity on the UE; for instance, data activity or UL SRS configuration for other activity
- If UE can handle multiple SRS configuration simultaneously or concurrently
- UE activities which may cause dropping of UL signals, including measurement gaps, interruptions due to receiver retuning, etc. (e.g., if such activities are ongoing, DeltaT may be shorter to reduce the probability of the first transmission failure, otherwise it can be longer)
- Method of triggering the transmissions in the UE, e.g., longer DeltaT for RRC (slow signaling) and shorter DeltaT for DCI (fast).

Time Line Control

UL-TDOA positioning methods may involve several Network node entities; such as LMF, gNB, RP (Reception Points, such as gNBs). LMFs may inform the RP well in advance as to when the RP should be prepared to listen to UE UL SRS.

In the legacy UL SRS transmission, a slot offset is provided; slotOffset
An offset in number of slots between the triggering DCI and the actual transmission of this SRS-ResourceSet. If the field is absent the UE typically applies no offset (value 0).

In aspects of embodiments, a LMF may request an aperiodic SRS transmission in a certain time instance (i.e. slot).

Alternatively, the LMF may request the gNB to trigger an aperiodic SRS transmission within a time interval. In both cases, the gNB may reply with a confirmation message (alternatively, the gNB may reject the LMF request). The confirmation message may also include the exact time for the SRS transmission, particularly where an aperiodic SRS transmission within a time interval is requested. This is depicted in FIG. 2, step 4 and 8, with Request for UL positioning information and Provide configured UL SRS. The step 4 is to configure/trigger or indicate the need for non-periodic UL signal from LMF to gNB and step 8 is the confirmation from gNB to LMF via provide a non-periodic UL signal configuration in response to the request/indication. This may also include the Tx slot (UE UL SRS transmission Tx) "Provide configured UE SRS configuration and tx slot".

In aspects of embodiments, the configuration may be provided at a determined time to ensure that the UE is transmitting when the receiving nodes are ready to receive, e.g., the SRS configuration is provided to LMF after the UE is configured and/or starts transmitting. The UE may be configured with a delayed transmission (i.e., not immediate upon configuration message reception) to ensure that the receiving nodes are ready to receive by then. The slotOffset or a new offset can be defined in accordance with a recommendation by the LMF to the gNB.

Figure 3:
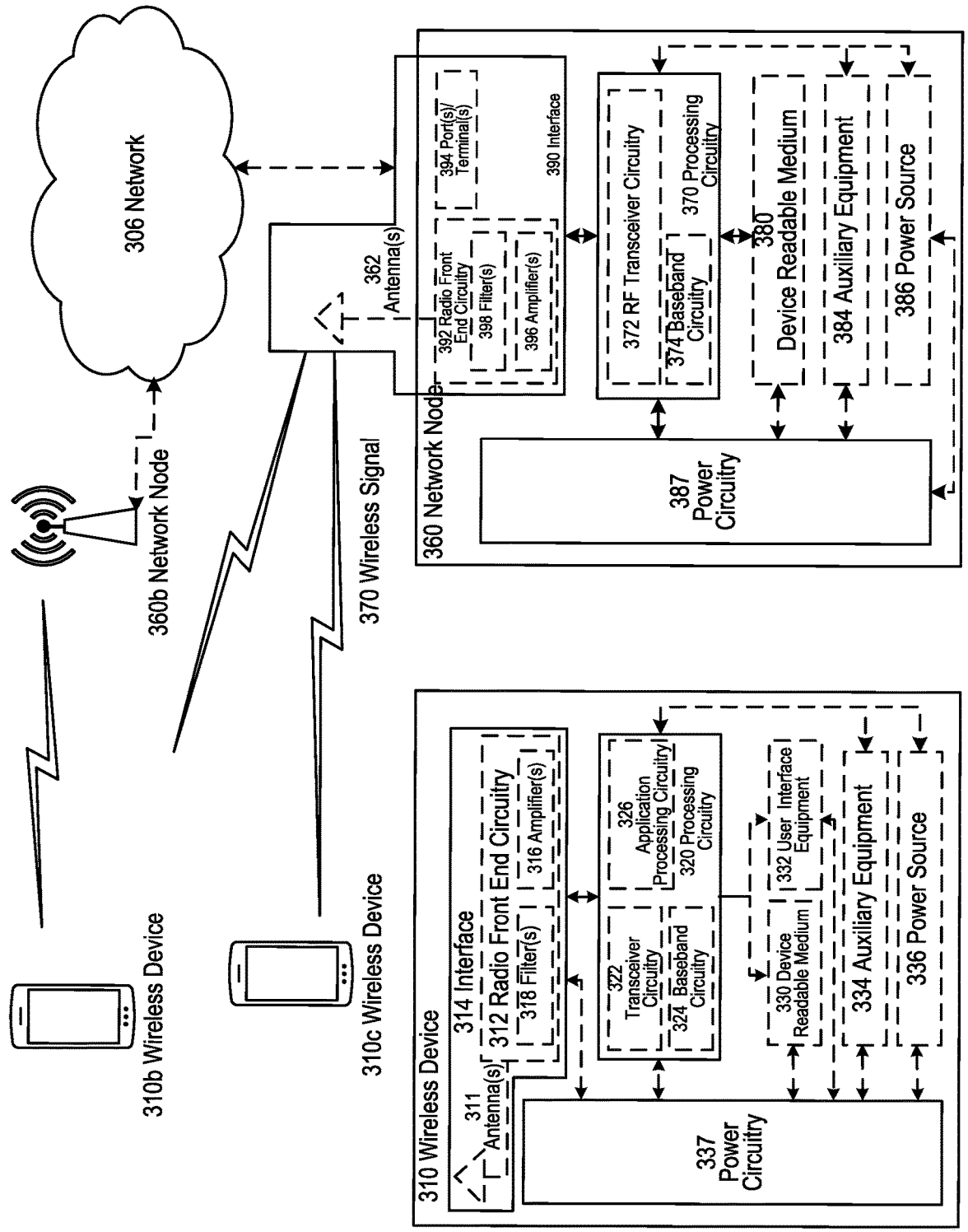
FIG. 3 is a schematic diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b (which may be base stations as discussed herein and which may be configured to implement any of the methods for configuring an uplink reference signal for positioning determination as discussed herein), and WDs 310, 310b, and 310c (which may be wireless devices as discussed herein and which may be configured to implement any of the methods for uplink signaling for positioning determination as discussed herein). In practice, a wireless network may further include any additional elements suitable to support communication between wireless devices or between a wireless device and another communication device, such as a landline telephone, a service provider, or any other network node (such as the core network nodes discussed herein) or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network and in particular the positioning determination functionality discussed herein. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node (for example, LMF or AMF functionality which may be provided by one or more core network nodes), base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signaling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network (such as positioning determination requests). Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
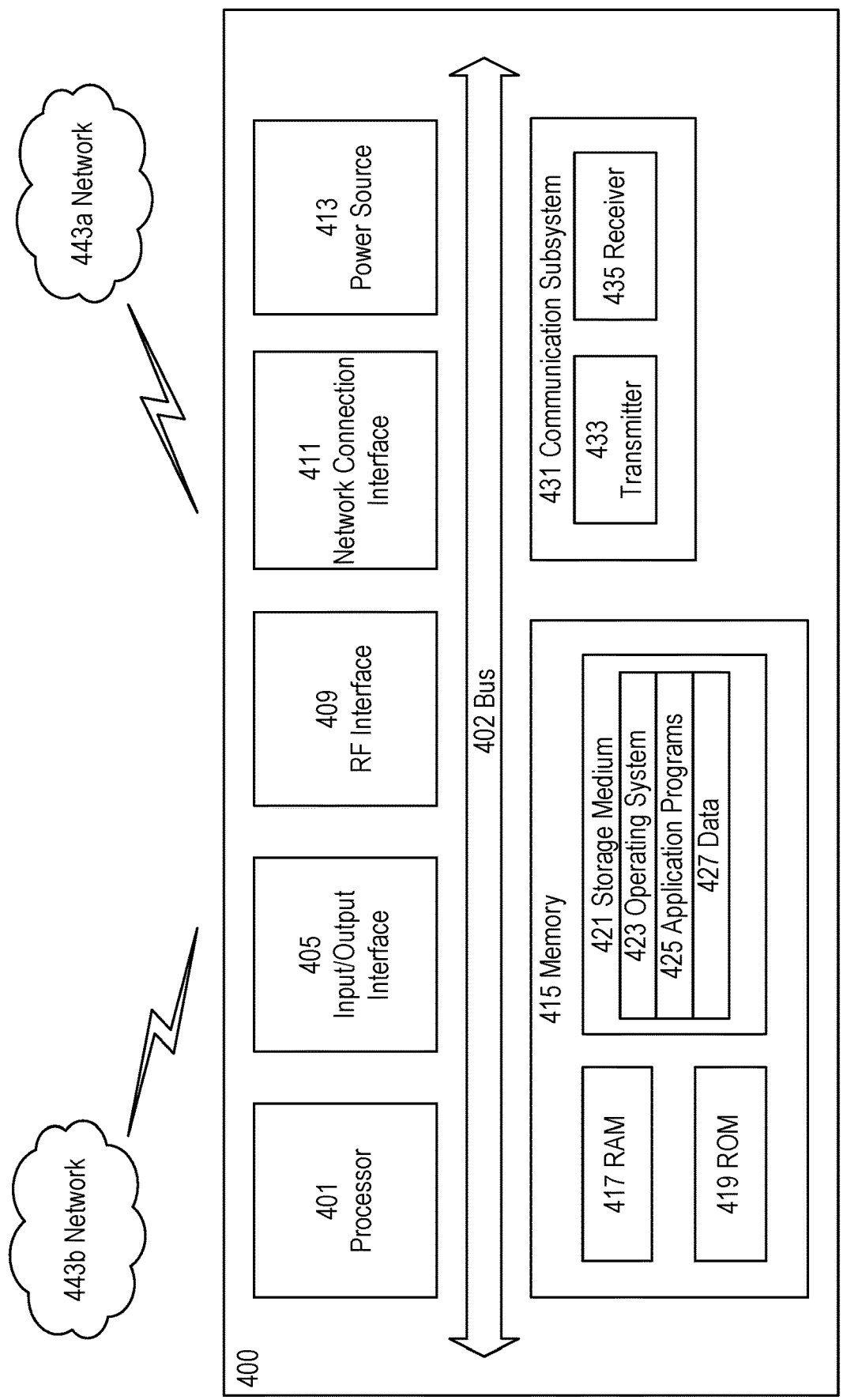
FIG. 4 is a schematic diagram of a user equipment in accordance with some embodiments.

FIG. 4 illustrates one embodiment of a UE in accordance with various aspects described herein, such as the wireless devices configured to perform uplink signaling for positioning determination as discussed herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
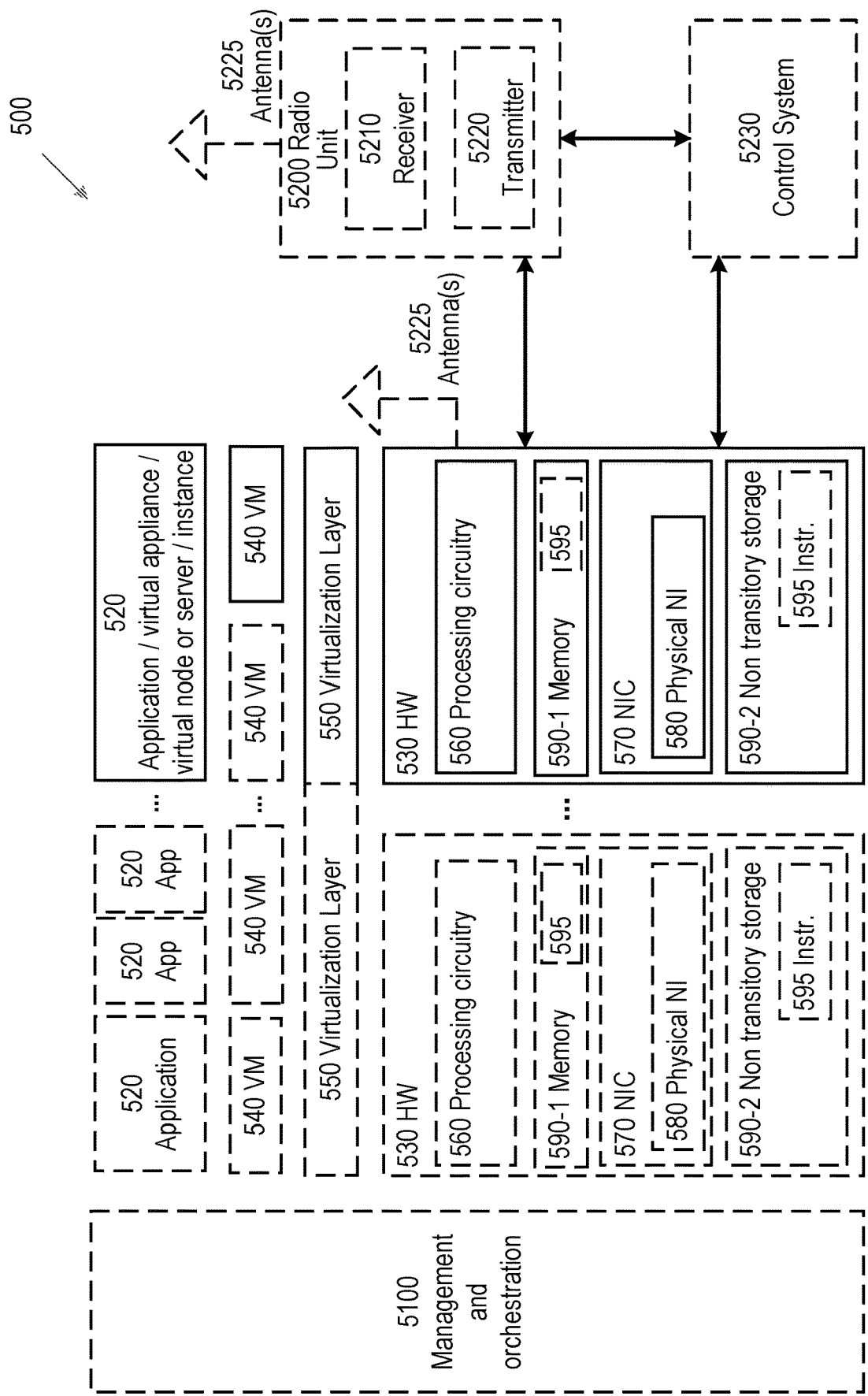
FIG. 5 is a schematic diagram of a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be effected with the use of control system 5230 which may alternatively be used for communication between the hardware nodes 530 and radio units 5200.

Figure 6:
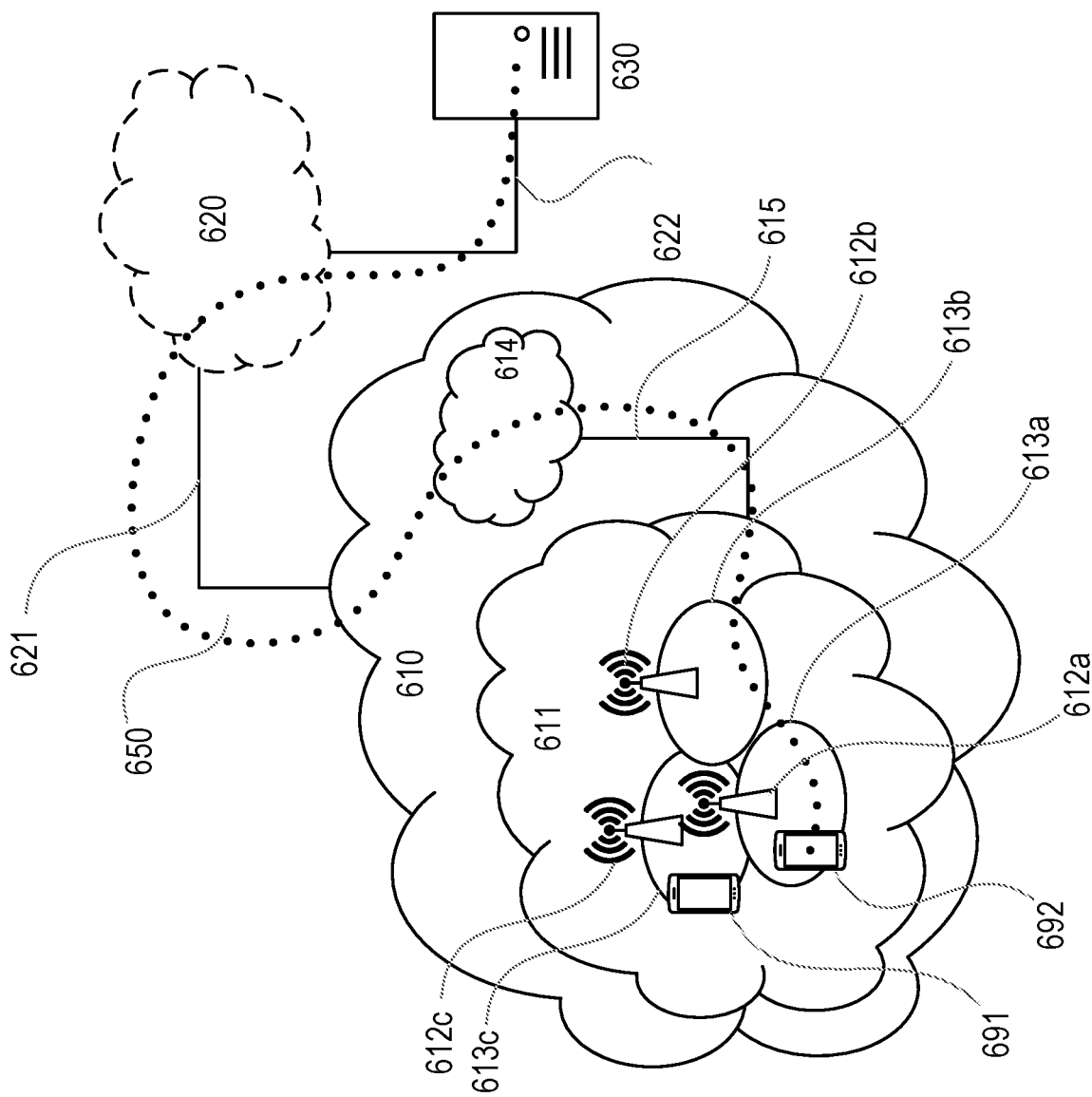
FIG. 6 is a schematic diagram of a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614, which may provide the LMF and AMF functions as discussed herein. Access network 611 comprises a plurality of base stations 612a, 612b, 612c, such as NBs, eNBs, gNBs or other types of wireless access points, each defining a corresponding coverage area 613a, 613b, 613c, one or more of which may be configured to perform the methods for configuring an uplink reference signal for positioning determination as discussed herein. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example (one or more of which may be configured to perform the methods for uplink signaling for positioning determination as discussed herein), the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
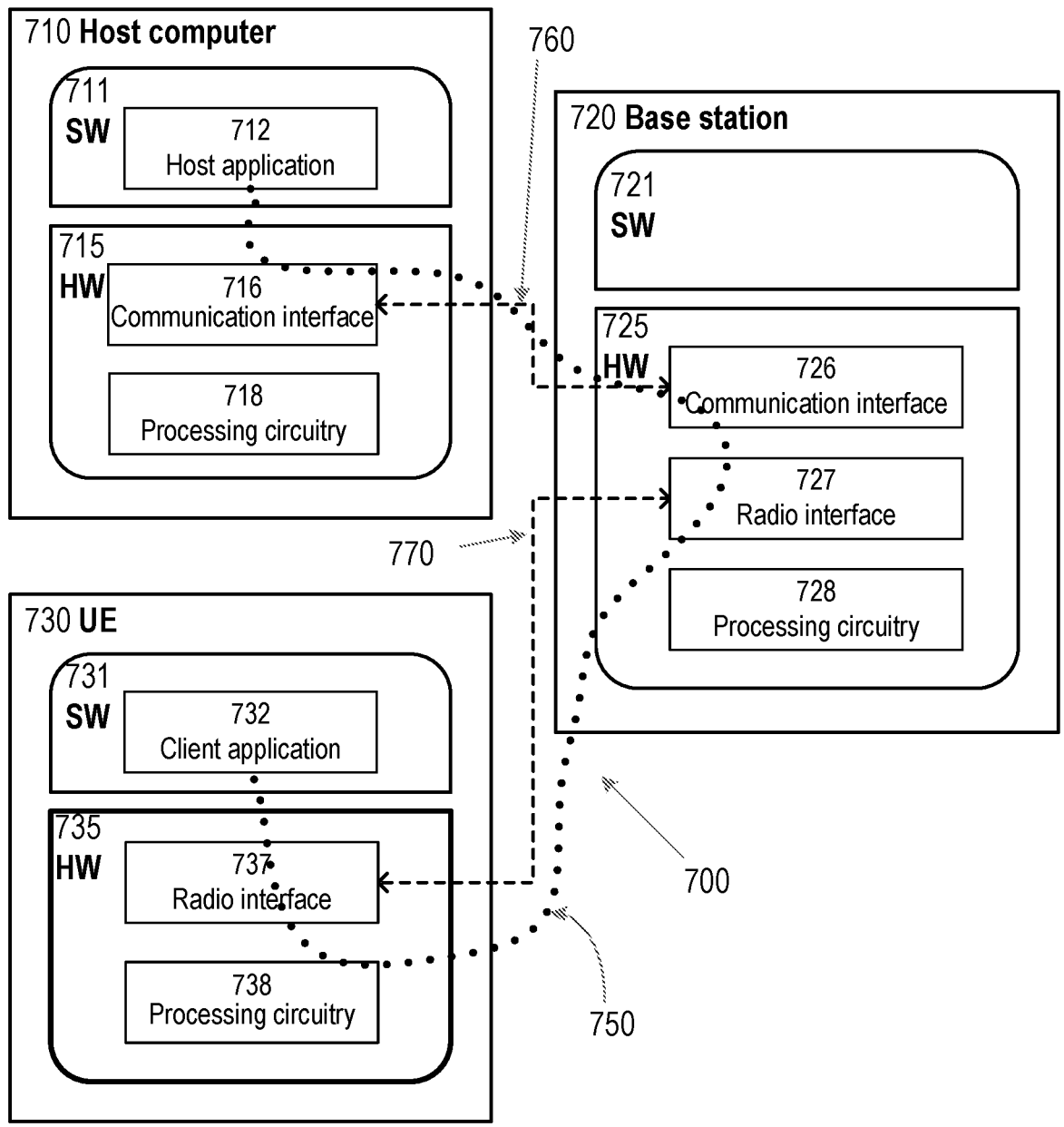
FIG. 7 is a schematic diagram of a host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the positioning determination of the system, reduce overheads and improve performance and thereby provide benefits such as reduced UE power consumption through support of semi-periodic and aperiodic signaling.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
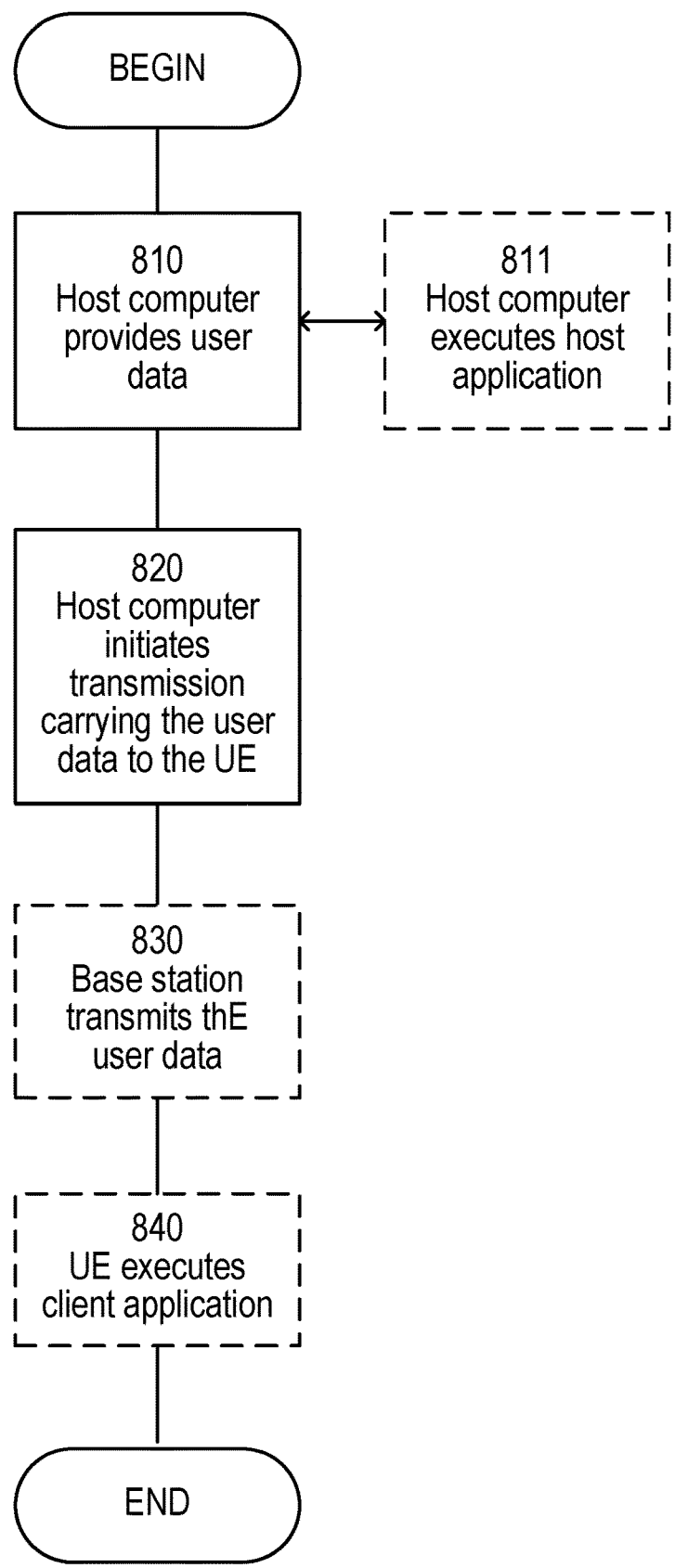
FIG. 8 is a flowchart showing methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
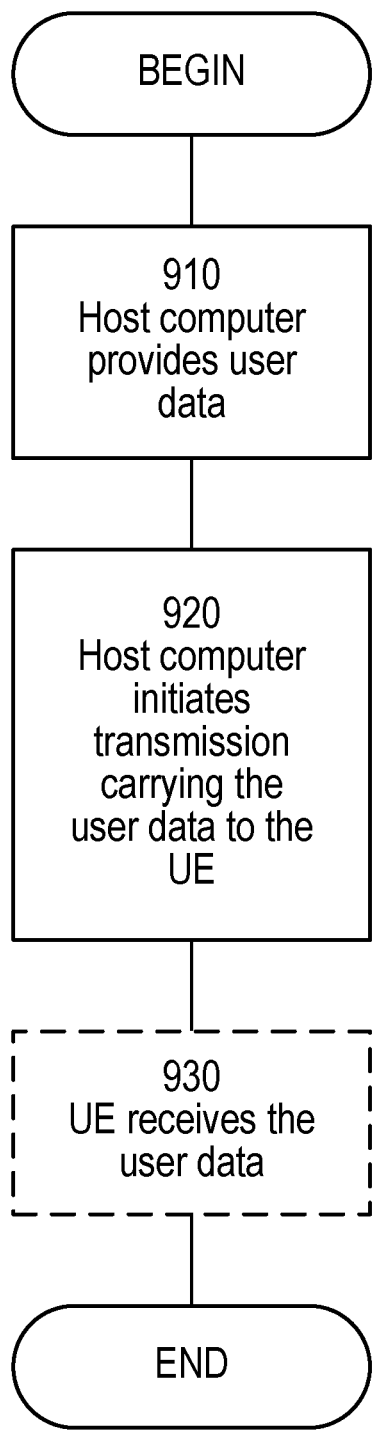
FIG. 9 is a flowchart showing methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
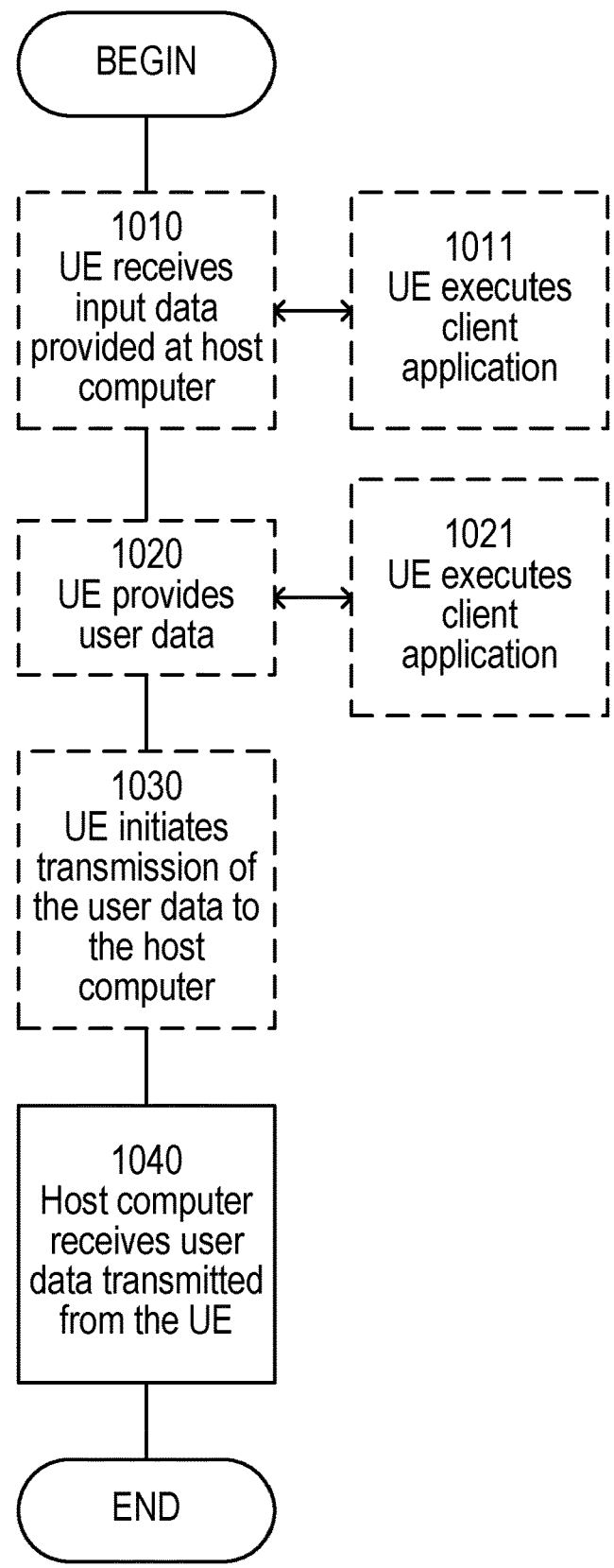
FIG. 10 is a flowchart showing methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
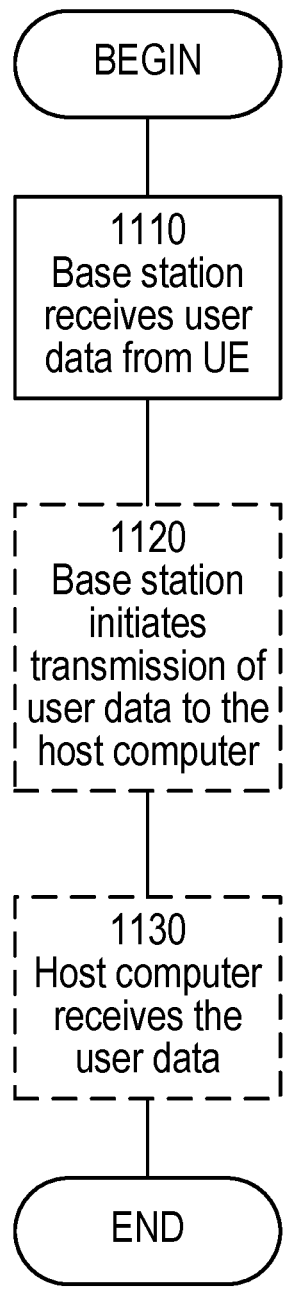
FIG. 11 is a flowchart showing methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 12:
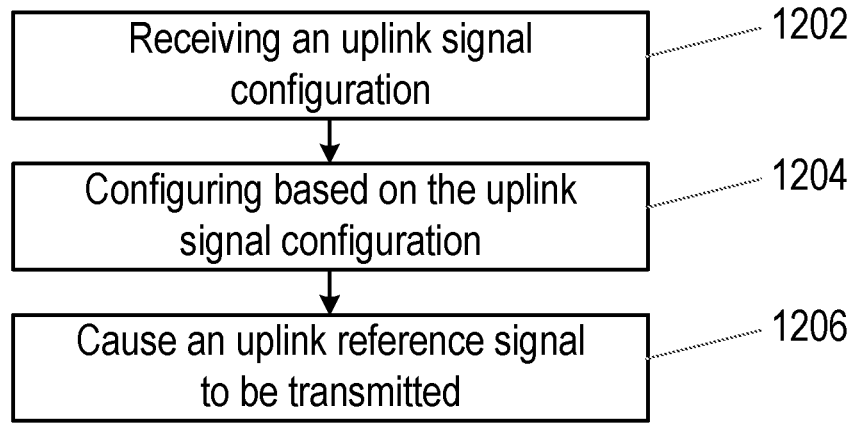
FIG. 12 is a flowchart showing methods in accordance with some embodiments.

FIG. 12 depicts a method performed by a wireless device for uplink signaling for positioning determination in accordance with particular embodiments, the method begins at step 1202 with receiving an uplink signal configuration. The receiving may be preceded by the transmission of wireless device information, and the receiving may be followed by the transmission of an acknowledgement. The method may further comprise, at step 1204, configuring the wireless device based on the uplink signal configuration. The method may further comprise, at step 1206, causing an uplink reference signal to be transmitted. The uplink reference signal may be transmitted aperiodically, or transmitted semi-periodically, and may be a SRS. The uplink reference signal may be caused to be transmitted at a predetermined transmission start time, which may be set to allow a delay, DeltaT.

Figure 13:
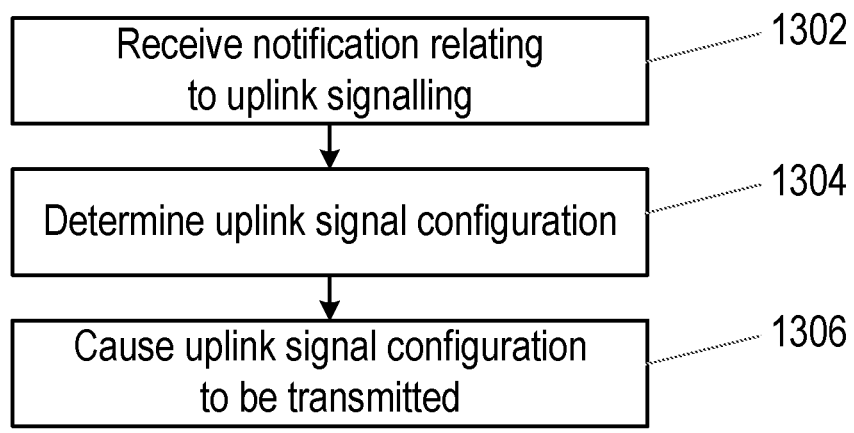
FIG. 13 is a flowchart showing methods in accordance with some embodiments.

FIG. 13 depicts a method performed by a base station for configuring an uplink reference signal for positioning determination in accordance with particular embodiments. The method begins at step 1302 with a base station receiving a notification relating to uplink signaling. The notification relating to uplink signaling may be a request to configure and trigger uplink signaling, or an indication of the need for uplink signaling, and may be sent by a LMF. The base station may cause a confirmation message to be sent to a LMF following the reception of the notification relating to uplink signaling. The method may further comprise, at step 1304, determining an uplink signal configuration. The method may further comprise receiving wireless device information prior to determining the uplink signal configuration, and using the wireless device information when determining the uplink signal configuration. The method may further comprise, at step 1306, causing the uplink signal configuration to be transmitted (either by the base station or another device). The uplink signal configuration may be transmitted by RRC and/or DCI. A wireless device receiving the uplink signal configuration may be instructed transmit an uplink reference signal at a predetermined transmission start time, wherein the predetermined transmission start time may be based on at least one of: a delay in informing reception points for the uplink reference signal; ongoing wireless device activity; whether or not the wireless device can provide multiple uplink reference signals simultaneously or concurrently; and wireless device transmission triggering methods.

Figure 14:
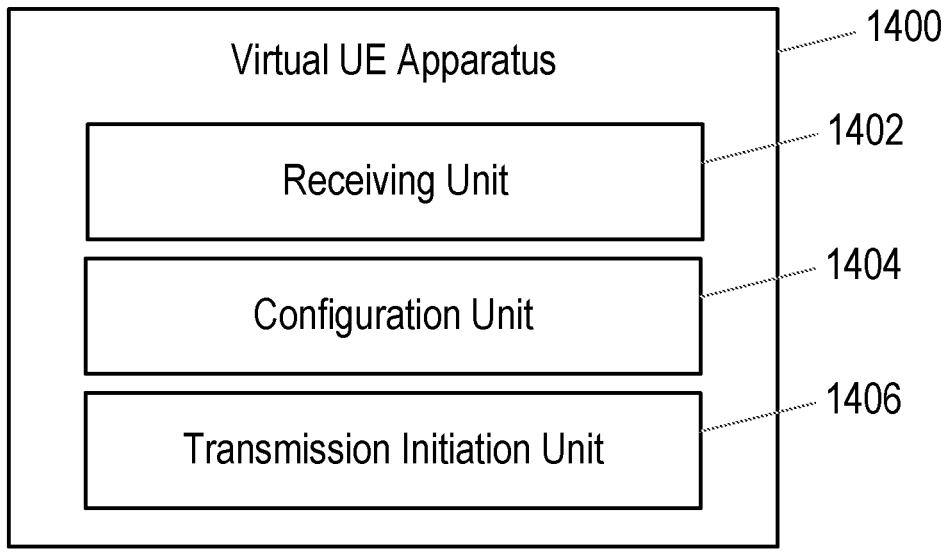
FIG. 14 is a schematic diagram of a virtualization apparatus in accordance with some embodiments.

As illustrated in FIG. 14, virtual UE apparatus 1400 includes receiving unit 1402, configuration unit 1404 and transmission initiation unit 1406.

FIG. 14 illustrates a schematic block diagram of a virtual UE apparatus 1400 in a wireless network (for example, the wireless network shown in FIG. 3). The apparatus may be implemented in one or more wireless devices (e.g. forming part of the network 306 shown in FIG. 3). Apparatus 1400 is operable to carry out the example method described with reference to FIG. 12 and possibly any other processes or methods disclosed herein. It is also to be understood that the method of FIG. 12 is not necessarily carried out solely by apparatus 1400. At least some operations of the method can be performed by one or more other entities. As illustrated in FIG. 14, virtual UE apparatus 1400 includes receiving unit 1402, configuration unit 1404 and transmission initiation unit 1406.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1402, to receive an uplink signal configuration, configuration unit 1404 to configure the virtual apparatus based on the received uplink signal configuration, transmission initiation unit 1406 to cause an uplink reference signal to be transmitted, and any other suitable units of apparatus 1400 to perform corresponding functions according one or more embodiments of the present disclosure.

Figure 15:
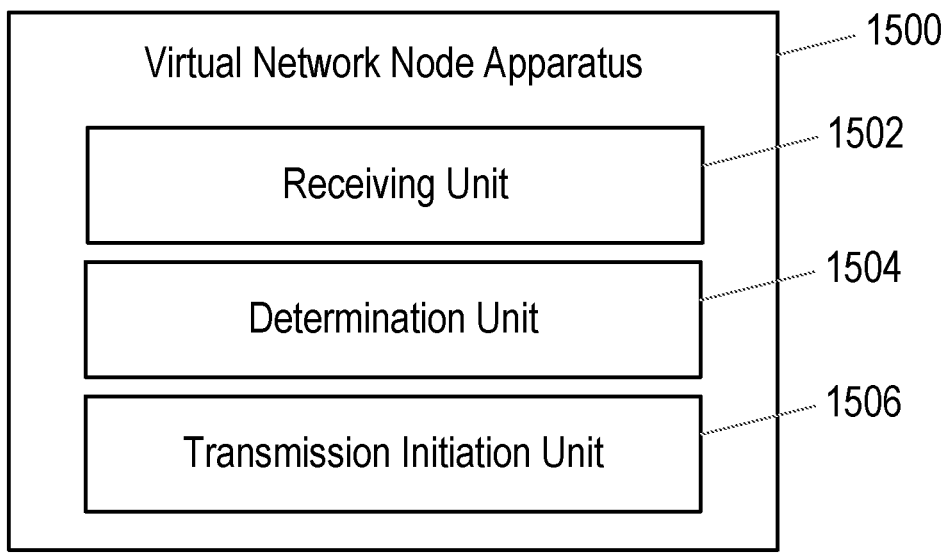
FIG. 15 is a schematic diagram of a virtualization apparatus in accordance with some embodiments.

As illustrated in FIG. 15, virtual network node apparatus 1500 includes receiving unit 1502, determination unit 1504, and transmission initiation unit 1506.

FIG. 15 illustrates a schematic block diagram of a virtual network node apparatus 1500 in a wireless network (for example, network node 360 in the wireless network shown in FIG. 3 The apparatus may be implemented in one or more network nodes (e.g. forming part of the network 306 shown in FIG. 3). Apparatus 1500 is operable to carry out the example method described with reference to FIG. 13 and possibly any other processes or methods disclosed herein. It is also to be understood that the method of FIG. 13 is not necessarily carried out solely by apparatus 1500. At least some operations of the method can be performed by one or more other entities. As illustrated in FIG. 15, virtual network node apparatus 1500 includes receiving unit 1502, determination unit 1504 and transmission initiation unit 1506.

Virtual network node apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the receiving unit 1502 to receive a notification relating to uplink signaling, to cause the determination unit 1504 to determine an uplink signal configuration, and/or to cause the transmission initiation unit 1506 to cause the uplink signal configuration to be transmitted.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The following numbered statements provide additional information on aspects of embodiments:

1. A method performed by a wireless device for uplink signaling for positioning determination, the method comprising:

Receiving an uplink signal configuration;

Configuring the wireless device based on the uplink signal configuration; and

Causing an uplink reference signal to be transmitted.

2. The method of statement 1, wherein the uplink signal configuration causes the uplink reference signal to be transmitted non-periodically.

3. The method of statement 2, wherein the uplink reference signal is transmitted aperiodically, or wherein the uplink reference signal is transmitted semi-periodically.

4. The method of any preceding statement, wherein the uplink reference signal is a SRS.

5. The method of any preceding statement further comprising the step of, prior to receiving the uplink signal configuration, causing the transmission of wireless device information.

6. The method of statement 5, wherein the wireless device information comprises signal configuration capability information and/or wireless device power/energy information.

7. The method of any preceding statement, wherein the form of the uplink reference signal is determined based on at least one of: the wireless device transmission power; bandwidth; a number of available symbols.

8. The method of any preceding statement, wherein the uplink reference signal is caused to be transmitted at a predetermined transmission start time.

9. The method of statement 8, wherein the predetermined transmission start time is set to allow a delay, DeltaT.

10. The method of any of statements 8 and 9, wherein the predetermined transmission start time is based on at least one of:

A delay in informing reception points for the uplink reference signal;

Ongoing wireless device activity;

Whether or not the wireless device can provide multiple uplink reference signals simultaneously or concurrently; and Wireless device transmission triggering methods.

11. The method of any preceding statement further comprising the step of, following the reception of the uplink signal configuration, transmitting an acknowledgement of reception and/or confirmation that the configuration of the wireless device has been completed.

12. The method of any of the previous statements, further comprising:

providing user data; and forwarding the user data to a host computer via the transmission to the base station.

13. A method for configuring an uplink reference signal for positioning determination, the method comprising, by a base station:

Receiving a notification relating to uplink signaling;

Determining an uplink signal configuration; and

Causing the uplink signal configuration to be transmitted.

14. The method of statement 13, further comprising informing, by the base station, a core network node of the determined uplink signal configuration.

15. The method of any of statements 13 and 14, wherein the uplink signal configuration is transmitted by RRC and/or DCI.

16. The method of any of statements 13 to 15, wherein the base station instructs a wireless device receiving the uplink signal configuration to transmit an uplink reference signal at a predetermined transmission start time.

17. The method of statement 16, wherein the predetermined transmission start time is set to allow a delay, DeltaT.

18. The method of statement 17, wherein the value of DeltaT is caused to be transmitted to a core network node.

19. The method of any of statement 16 to 18, wherein the predetermined transmission start time is based on at least one of:

A delay in informing reception points for the uplink reference signal;

Ongoing wireless device activity;

Whether or not the wireless device can provide multiple uplink reference signals simultaneously or concurrently; and Wireless device transmission triggering methods.

20. The method of any of statements 13 to 15, wherein the base station instructs a wireless device receiving the uplink signal configuration to transmit an uplink reference signal as soon as the wireless device has applied the uplink signal configuration.

21. The method of any of statements 13 to 20, wherein the uplink signal configuration causes the uplink reference signal to be transmitted non-periodically.

22. The method of statement 21, wherein the uplink reference signal is transmitted aperiodically, or wherein the uplink reference signal is transmitted semi-periodically.

23. The method of any of statements 13 to 22, wherein the uplink reference signal is a SRS.

24. The method of any of statements 13 to 23 further comprising, by the base station, receiving wireless device information prior to determining the uplink signal configuration, and using the wireless device information when determining the uplink signal configuration.

25. The method of any of statements 13 to 24, wherein the notification relating to uplink signaling is a request to configure and trigger uplink signaling, or an indication of the need for uplink signaling.

26. The method of statement 25, wherein the notification relating to uplink signaling is caused to be sent by a location management function in a core network node.

27. The method of statement 25, wherein the location management function determines uplink signaling requirements, and notifies the base station of the uplink signaling requirements in the notification relating to uplink signaling.

28. The method of statement 27, wherein the location management function determines the uplink signaling requirements based on at least one of:

A target QoS for positioning involving the uplink reference signal;

A type of positioning application: long periodically occurring, short periodically occurring or impulse nature, commercial or emergency;

Resources available at the base station, including the base station capabilities and desirable uplink reference signal configurations;

Capabilities of the wireless device related to uplink reference signal configurations;

The power/energy situation of the wireless device

The environment type in the vicinity of the wireless device and/or base station and/or core network node.

29. The method of any of statements 26 to 28, wherein the notification relating to uplink signaling comprises:

one or more preferred uplink reference signal configurations; and/or bandwidth, number of symbols and/or resource element density requirements, of the uplink reference signal.

30. The method of any of statements 26 to 28, wherein the location management function determines a suitable uplink reference signal configuration using a metric, and sends the metric to the base station in the notification relating to uplink signaling, and wherein the base station uses the metric to determine an uplink signal configuration.

31. The method of any of statements 26 to 30, wherein the base station causes a confirmation message to be sent to the location management function following the reception of the notification relating to uplink signaling.

32. The method of statement 31, wherein the confirmation includes the timing for the uplink reference signal.

33. The method of any of statements 26 to 32, wherein the notification relating to uplink signaling is caused to be sent by the location management function in response to a location service request from an application management function.

34. The method of statement 33, wherein the location service request relates to a single wireless device, or wherein the location service request relates to a plurality of wireless devices.

35. The method of any of statements 13 to 34, further comprising:

obtaining user data; and forwarding the user data to a host computer or a wireless device.

36. A wireless device for uplink signaling for positioning determination, the wireless device comprising:
processing circuitry configured to perform any of the steps of any of statements 1 to 12; and
power supply circuitry configured to supply power to the wireless device.

37. A base station for configuring an uplink reference signal for positioning determination, the base station comprising:
processing circuitry configured to perform any of the steps of any of statements 13 to 35;
power supply circuitry configured to supply power to the base station.

38. A user equipment (UE) for uplink signaling for positioning determination, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of statements 1 to 12;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

39. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of statements 13 to 35.

40. The communication system of statement 39 further including the base station.

41. The communication system of statement 39 or 40, further including the UE, wherein the UE is configured to communicate with the base station.

42. The communication system of statement 39-41, wherein:
the processing circuitry of the host computer is configured to execute a host application, thereby providing the user data; and
the UE comprises processing circuitry configured to execute a client application associated with the host application.

43. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of statements 13 to 35.

44. The method of statement 43, further comprising, at the base station, transmitting the user data.

45. The method of statement 43 or 44, wherein the user data is provided at the host computer by executing a host application, the method further comprising, at the UE, executing a client application associated with the host application.

46. A user equipment (UE) configured to communicate with a base station, the UE comprising a radio interface and processing circuitry configured to perform the method of statement 43-45.

47. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of statements 1 to 12.

48. The communication system of statement 47, wherein the cellular network further includes a base station configured to communicate with the UE.

49. The communication system of statement 47 or 48, wherein:
the processing circuitry of the host computer is configured to execute a host application, thereby providing the user data; and
the UE's processing circuitry is configured to execute a client application associated with the host application.

50. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of statements 1 to 12.

51. The method of statement 50, further comprising at the UE, receiving the user data from the base station.

52. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of statements 1 to 12.

53. The communication system of statement 52, further including the UE.

54. The communication system of statement 52 and 53, further including the base station, wherein the base station comprises a radio interface configured to communicate with the UE and a communication interface configured to forward to the host computer the user data carried by a transmission from the UE to the base station.

55. The communication system of statement 52-54, wherein:
the processing circuitry of the host computer is configured to execute a host application; and
the UE's processing circuitry is configured to execute a client application associated with the host application, thereby providing the user data.

56. The communication system of statement 52-55, wherein:
the processing circuitry of the host computer is configured to execute a host application, thereby providing request data; and
the UE's processing circuitry is configured to execute a client application associated with the host application, thereby providing the user data in response to the request data.

57. A method implemented in a communication system including a host computer, a base station and a user equipment (UE), the method comprising:
at the host computer, receiving user data transmitted to the base station from the UE, wherein the UE performs any of the steps of any of statements 1 to 12.

58. The method of statement 57, further comprising, at the UE, providing the user data to the base station.

59. The method of statement 57 or 58, further comprising:
at the UE, executing a client application, thereby providing the user data to be transmitted; and
at the host computer, executing a host application associated with the client application.

60. The method of statement 57-59, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of statements 13 to 35.

62. The communication system of statement 61 further including the base station.

63. The communication system of statement 61 or 62, further including the UE, wherein the UE is configured to communicate with the base station.

64. The communication system of statement 61-63, wherein:
the processing circuitry of the host computer is configured to execute a host application;
the UE is configured to execute a client application associated with the host application, thereby providing the user data to be received by the host computer.

65. A method implemented in a communication system including a host computer, a base station and a user equipment (UE), the method comprising:
at the host computer, receiving, from the base station, user data originating from a transmission which the base station has received from the UE, wherein the UE performs any of the steps of any of statements 1 to 12.

66. The method of statement 65, further comprising at the base station, receiving the user data from the UE.

67. The method of statement 65 or 66, further comprising at the base station, initiating a transmission of the received user data to the host computer.

The following 3GPP TSG-RAN agenda item forms part of the disclosure and provides additional information on aspects of embodiments:

3GPP TSG-RAN WG3 #106  R3106_GLM01

Reno, NV, USA, 18-22 November 2019

| | |
|---|---|
| Agenda Item: | 19.2 |
| Source: | Ericsson |
| Title: | Support for UL Positioning Measurements in NG-RAN |
| Document for: | Approval |

1 INTRODUCTION

Uplink positioning for NR is being discussed in RAN1 and RAN2. In this contribution we would like to discuss a possible way to support uplink positioning measurements in RAN3.

2 DISCUSSION

One of the possible methods to determine the position of a UE is to trigger the UE to transmit well-known signals, known as SRS (Sounding Reference Signals) which are then measured by the radio network. In E-UTRAN this was introduced as the UTDOA method, where the eNB configured the UE with a certain SRS configuration and the LMU (Location Measurement Unit) performed the actual measurement and signaled the result to the E-SMLC (through the dedicated SLm interface and SLmAP protocol [1].

Concerning uplink positioning measurements, there are at least two notable differences between NG-RAN and E-UTRAN:

- There is no LMU in the NG-RAN positioning architecture (hence no SLm) – all the UL positioning measurements are performed in the TRPs (part of the gNB-DU);
- NG-RAN positioning needs to take into account the CU-DU split – it is the gNB-CU that configures the UE via RRC.

The consequence is that the necessary SLmAP functions need to be taken by NRPPa and F1AP.

Proposal 1: To support uplink positioning measurements, the necessary SLmAP functions should be taken by NRPPa and F1AP.

Furthermore, as discussed in [2], it seems desirable to design general purpose F1 procedures to transport positioning measurements from the DU to the CU. We will follow the same approach here.

2.1 General Signaling Flow

Figure 16A:
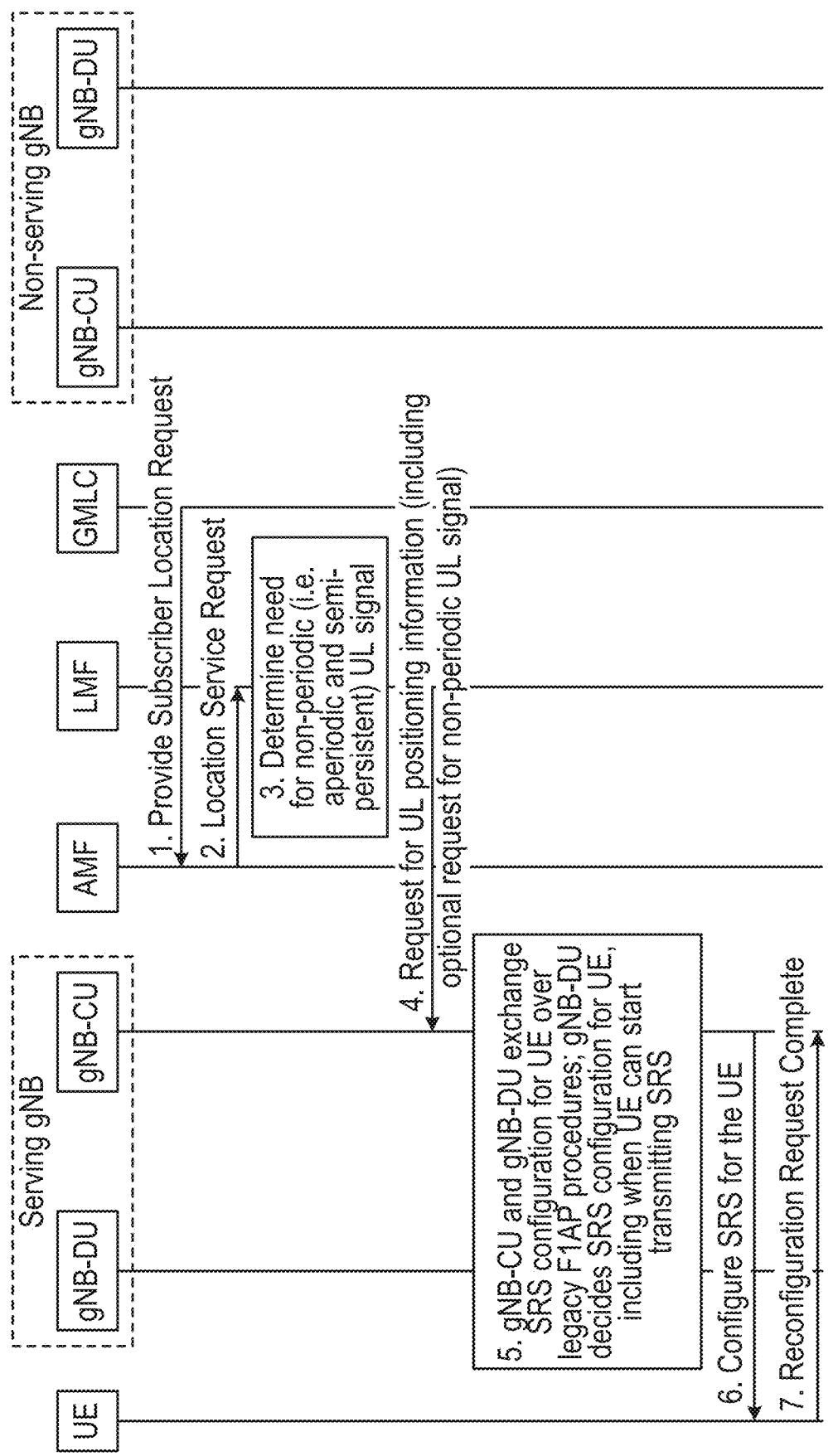
FIG. 16A-B is a possible signaling flow for configuration and reporting of UL positioning measurements in NG-RAN.
Figure 16B:
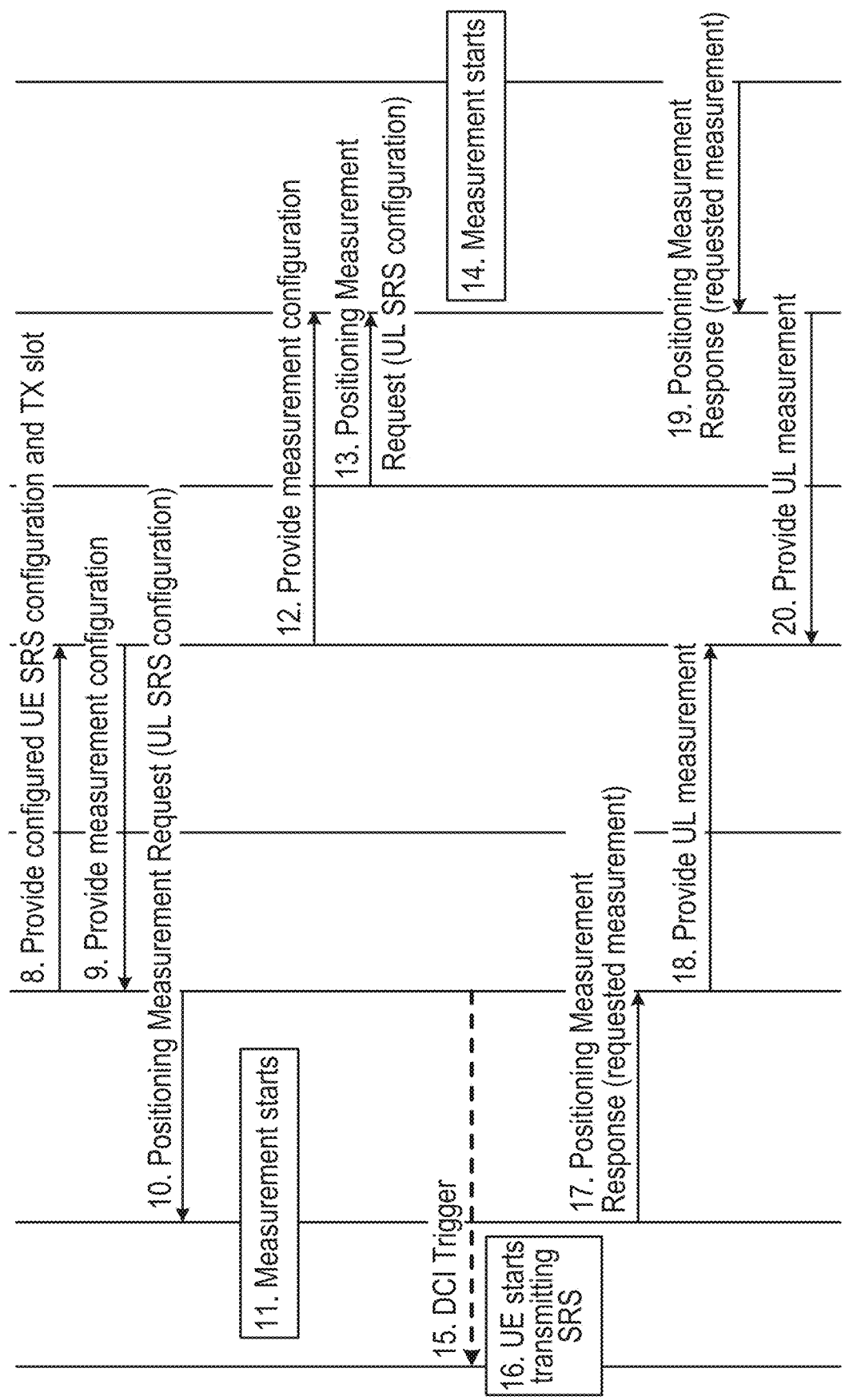

The general signaling flow for SRS measurement is shown in Figure 16. 5GC messages (out of RAN3 scope but shown here for completeness) are numbered 1 and 2; NRPPa exchanges are numbered 4, 8, 9, 12, 18 and 20;

F1AP messages are numbered 10, 13 ,17 and 19; RRC exchanges (out of RAN3 scope but shown here for completeness) are numbered 6 and 7.

The steps are as follows.

1. The GMLC requests the AMF to provide a location for the served UE;
2. The AMF relays the Location Service Request to the LMF;
3. The LMF determines the need for UL measurements, including the need for non-periodic (i.e. aperiodic and semi-persistent UL signals) (out of RAN3 scope);
4. The LMF signals to the serving gNB-CU (via NRPPa) a request for UL positioning information suggesting a possible SRS configuration for the UE, optionally including e.g. the request for non-periodic UL signals;
5. The serving gNB-CU and gNB-DU exchange SRS configuration over F1AP legacy procedures; the serving gNB-DU decides the SRS configuration for the UE, including the time when the UE shall start transmitting SRS;
6. The serving gNB-CU signals the configuration to the UE via RRC or DCI (out of RAN3 scope);
7. The UE replies via RRC (out of RAN3 scope);
8. The serving gNB-CU replies to the LMF (via NRPPa) the configured UE SRS configuration, including e.g. the TX slot;
9. The LMF requests to the serving gNB-CU the measurement, signaling the configured SRS configuration;
10. The serving gNB-CU requests to the gNB-DU(s) via F1AP the required positioning measurement, signaling the configured SRS configuration;
11. Measurement starts at the gNB-DU(s);
12. The LMF requests to one or more non-serving gNB-CUs the measurement, signaling the configured SRS configuration;
13. The non-serving gNB-CU(s) request to gNB-DU(s) via F1AP the required positioning measurement, signaling the configured SRS configuration;
14. Measurement starts at the gNB-DU(s);
15. The serving gNB-CU triggers SRS transmission in the UE via DCI (optional; out of RAN3 scope);
16. The UE starts transmitting SRS with the configured configuration;
17. The gNB-DU(s) signal via F1AP to the serving gNB-CU the requested UL measurement;
18. The serving gNB-CU provides via NRPPa the UL measurement to the LMF (e.g. through a separate Class 2 procedure);
19. The gNB-DU(s) signal via F1AP to the non-serving gNB-CU(s) the requested UL measurement;
20. The non-serving gNB-CU(s) signal provides via NRPPa the UL measurement to the LMF.

Some observations:

Observation 1: At least for UL positioning measurements, there is no difference between a serving gNB-DU and a non-serving one, because the gNB-DU is only used to provide the measurements thanks to its included TRP(s).

The measurements performed in the serving and in the non-serving gNBs are independent and will be typically performed and reported to the LMF in parallel (in other words, sequences 9,10-,11,17,18 and 12,13,14,19,20 will typically be parallel).

Proposal 2: The measurements performed in the serving and in the non-serving gNBs are independent and will be typically performed and reported to the LMF in parallel.

A TP for the BL NRPPa CR is provided in the Annex. A TP for F1AP is provided in [3].

3 CONCLUSIONS AND PROPOSALS (IF ANY)

Our proposals are summarized below.

Proposal 1: To support uplink positioning measurements, the necessary SLmAP functions should be taken by NRPPa and F1AP.

Proposal 2: The measurements performed in the serving and in the non-serving gNBs are independent and will be typically performed and reported to the LMF in parallel.

4 REFERENCES

[1] TS 36.459.
[2] R3106_GLM02a How to Support Positioning Measurements in F1AP, Ericsson.
[3] R3106_GLM02c Support for Positioning Measurements in F1AP, Ericsson.

TEXT PROPOSAL FOR BL CR TO TS 38.455

START OF CHANGES

7 FUNCTIONS OF NRPPA

The NRPPa protocol provides the following functions:

- E-CID Location Information Transfer. This function allows the NG-RAN node to exchange location information with LMF for the purpose of E-CID positioning.

- OTDOA Information Transfer. This function allows the NG-RAN node to exchange information with the LMF for the purpose of OTDOA positioning.

- Reporting of General Error Situations. This function allows reporting of general error situations, for which function specific error messages have not been defined.

- Positioning Information Transfer. This function allows the NG-RAN node to exchange positioning information with the LMF for the purpose of positioning.

- Measurement Information Transfer. This function allows the LMF to exchange measurement information with the NG-RAN node for the purpose of positioning.

The mapping between the above functions and NRPPa EPs is shown in the table below.

Table 7-1: Mapping between NRPPa functions and NRPPa EPs

| Function | Elementary Procedure(s) |
|---|---|
| E-CID Location Information Transfer | a) E-CID Measurement Initiation<br>b) E-CID Measurement Failure Indication<br>c) E-CID Measurement Report<br>d) E-CID Measurement Termination |
| OTDOA Information Transfer | OTDOA Information Exchange |
| Reporting of General Error Situations | Error Indication |
| Positioning Information Transfer | a) Positioning Information Exchange<br>b) Positioning Information Update |
| Measurement Information Transfer | a) Measurement<br>b) Measurement Update<br>c) Measurement Abort |

NEXT CHANGE

8  NRPPA PROCEDURES

8.1  Elementary procedures

In the following tables, all EPs are divided into Class 1 and Class 2 EPs.

Table 8.1-1: Class 1 Elementary Procedures

| Elementary Procedure | Initiating Message | Successful Outcome<br>Response message | Unsuccessful Outcome<br>Response message |
|---|---|---|---|
| E-CID Measurement Initiation | E-CID MEASUREMENT INITIATION REQUEST | E-CID MEASUREMENT INITIATION RESPONSE | E-CID MEASUREMENT INITIATION FAILURE |
| OTDOA Information Exchange | OTDOA INFORMATION REQUEST | OTDOA INFORMATION RESPONSE | OTDOA INFORMATION FAILURE |
| Positioning Information Exchange | POSITIONING INFORMATION REQUEST | POSITIONING INFORMATION RESPONSE | POSITIONING INFORMATION FAILURE |
| Measurement | MEASUREMENT REQUEST | MEASUREMENT RESPONSE | MEASUREMENT FAILURE |

Table 8.1-2: Class 2 Elementary Procedures

| Elementary Procedure | Initiating Message |
|---|---|
| E-CID Measurement Failure Indication | E-CID MEASUREMENT FAILURE INDICATION |
| E-CID Measurement Report | E-CID MEASUREMENT REPORT |
| E-CID Measurement Termination | E-CID MEASUREMENT TERMINATION COMMAND |
| Error Indication | ERROR INDICATION |
| Positioning Information Update | POSITIONING INFORMATION UPDATE |
| Measurement Report | MEASUREMENT REPORT |
| Measurement Update | MEASUREMENT UPDATE |
| Measurement Abort | MEASUREMENT ABORT |
| Measurement Failure Indication | MEASUREMENT FAILURE INDICATION |

NEXT CHANGE 8.2.x  Positioning Information Exchange

Figure 17:
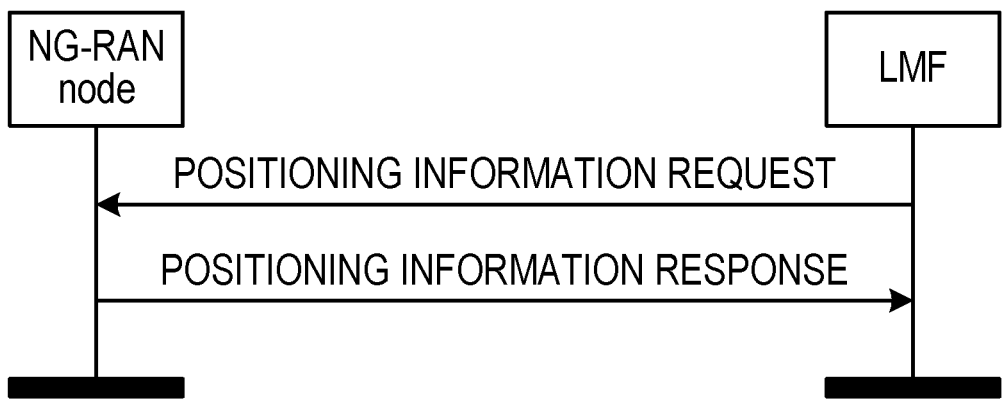
FIG. 17 is a schematic diagram of a Positioning Information Exchange procedure, successful operation, referred to in the context of the agenda item as Figure 8.2.x.2-1.

The Positioning Information Exchange procedure is initiated by the LMF to request to the NG-RAN NODE positioning information for the UE. A successful operation is shown in Figure 17.

The LMF initiates the procedure by sending a POSITIONING INFORMATION REQUEST message to the NG-RAN node.

If the *Requested SRS Transmission Characteristics* IE is included in the POSITIONING INFORMATION REQUEST message, the NG-RAN node may take this information into account when configuring SRS transmissions for the UE, and it shall include the *SRS Configuration* IE in the POSITIONING INFORMATION RESPONSE message.

[Editor's Note: further details are FFS pending RAN2]

Figure 18:
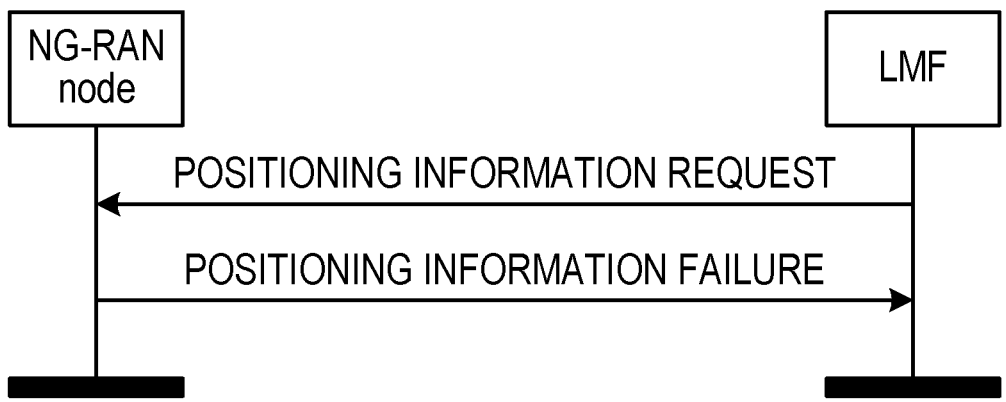
FIG. 18 is a schematic diagram of a Positioning Information Exchange procedure, unsuccessful operation, referred to in the context of the agenda item as Figure 8.2.6.3-1.

If the NG-RAN node is unable to configure any SRS transmissions for the UE, it shall respond with a POSITIONING INFORMATION FAILURE message. If a handover of the target UE has been triggered, the NG-RAN node shall send a POSITIONING INFORMATION FAILURE message with an appropriate cause value. An unsuccessful operation is shown in Figure 18.

Void.

8.2.y  Positioning Information Update

The Positioning Information Update procedure is initiated by the NG-RAN node to indicate to the LMF that a change has occurred in the SRS configuration.

Figure 19:
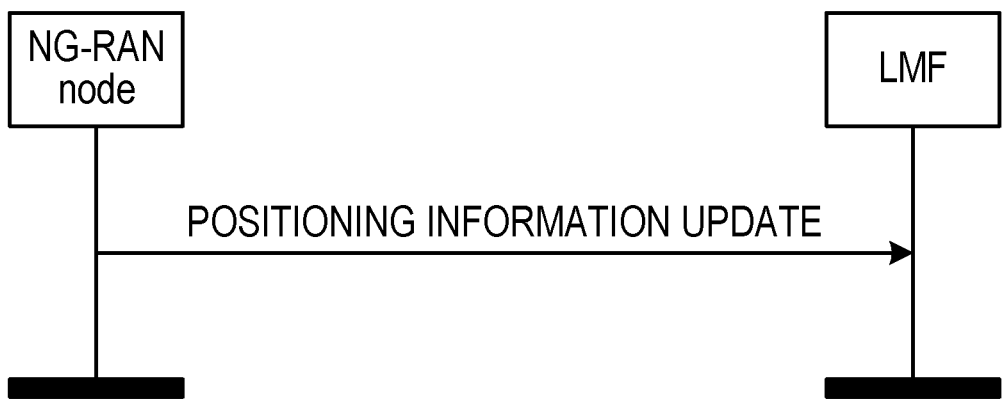
FIG. 19 is a schematic diagram of a Positioning Information Update procedure, successful operation, referred to in the context of the agenda item as Figure 8.2.y.2-1.

The NG-RAN node initiates the procedure by sending a POSITIONING INFORMATION UPDATE message to the LMF. This message shall include the SRS configuration information for all cells where the SRS configuration has changed. A successful operation is shown in Figure 19.

Not Applicable.

Void.

NEXT CHANGE

8.z    Measurement Information Transfer

8.z.1   Measurement

The Measurement procedure allows the LMF to request the NG-RAN node to perform and report positioning measurements.

Figure 20:
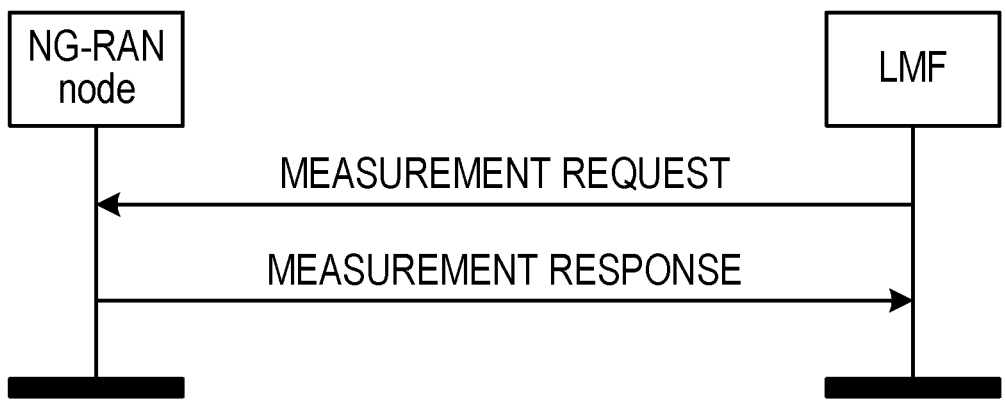
FIG. 20 is a schematic diagram of a Measurement procedure. Successful operation, referred to in the context of the agenda item as Figure 8.z.1.2.1.

The LMF initiates the procedure by sending a MEASUREMENT REQUEST message to the NG-RAN node. The NG-RAN node shall use the included information to configure positioning measurements. If the requested measurements have been successful, the NG-RAN node shall reply with a MEASUREMENT RESPONSE message. A successful operation is shown in Figure 20.

If the *Report Characteristics* IE is set to "OnDemand", the NG-RAN node shall return the corresponding measurement results in the POSITIONING INFORMATION RESPONSE message, and the LMF shall consider that this measurement has been terminated by the NG-RAN node. If the *Report Characteristics* IE is set to "Periodic", the NG-RAN node shall initiate the corresponding measurement, and it shall reply with the MEASUREMENT RESPONSE message without including this measurement in the message. The NG-RAN node shall then periodically initiate the Measurement Report procedure for the corresponding measurements, with the requested reporting periodicity.

If the *SRS Configuration* IE is included in the MEASUREMENT REQUEST message, the NG-RAN node shall include the *UL RTOA Measurement* IE in the MEASUREMENT RESPONSE message.

[Editor's Note: further details are FFS pending RAN2]

Figure 21:
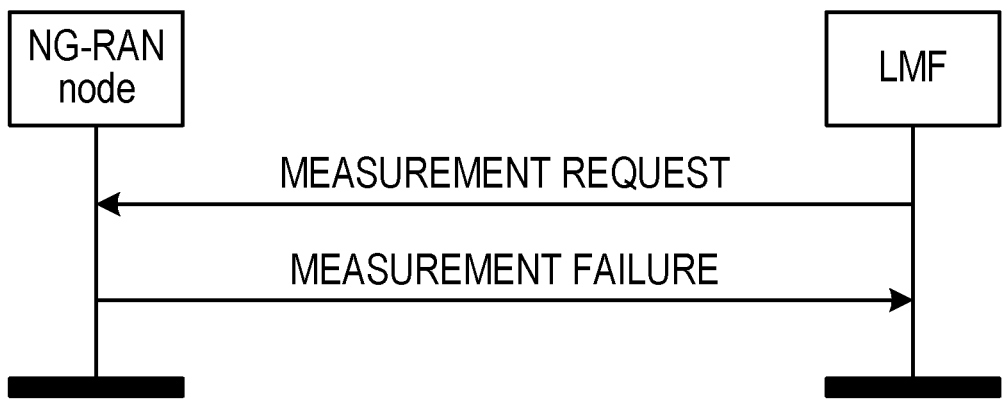
FIG. 21 is a schematic diagram of a Measurement procedure. Unsuccessful operation, referred to in the context of the agenda item as Figure 8.z.1.3.1.

If the NG-RAN node cannot configure the requested measurements, it shall respond with a MEASUREMENT FAILURE message with an appropriate cause value. An unsuccessful operation is shown in Figure 21.

Not applicable.

8.z.2   Measurement Report

The Measurement Report procedure allows the NG-RAN node to report positioning measurements to the LMF.

The NG-RAN node initiates the procedure by sending a MEASUREMENT REPORT message to the LMF. The NG-RAN node shall use the included information to configure positioning measurements. If the requested measurements have been successful, the NG-RAN node shall reply with a MEASUREMENT RESPONSE message.

Figure 22:
FIG. 22 is a schematic diagram of a Measurement Report procedure. Successful operation, referred to in the context of the agenda item as Figure 8.z.2.2.1.

If the *UL RTOA Measurement* IE is included in the MEASUREMENT RESPONSE message, the LMF shall use it for UL RTOA positioning for the UE. A successful operation is shown in Figure 22.

[Editor's Note: further details are FFS pending RAN2]

8.z.3 Measurement Update

The Measurement Update Procedure allows the LMF to notify the NG-RAN node of a change in a previously configured measurement.

Figure 23:
FIG. 23 is a schematic diagram of a Measurement Update: Successful Operation, referred to in the context of the agenda item as Figure 8.z.3.2.1.

The LMF initiates the procedure by sending a MEASUREMENT UPDATE message. Upon receiving the message, the NG-RAN node shall overwrite the previously received measurement configuration. A successful operation is shown in Figure 23.

Not applicable.

If the NG-RAN node cannot identify the previously requested measurement to be modified, it shall consider the procedure as failed and initiate local error handling.

8.z.4 Measurement Abort

The purpose of the Measurement Abort Procedure is to enable the LMF to abort an on-going measurement.

The LMF initiates the procedure by sending a MEASUREMENT ABORT message.

Figure 24:
FIG. 24 is a schematic diagram of a Measurement Abort Procedure: Successful Operation, referred to in the context of the agenda item as Figure 8.z.4.2.1.

Upon receiving this message, the NG-RAN node shall terminate the on-going measurement identified by the *LMF Measurement ID* IE and may release any resources previously allocated for the same measurement. A successful operation is shown in Figure 24.

Not applicable.

If the NG-RAN node cannot identify the previously requested measurement to be aborted, it shall ignore the MEASUREMENT ABORT message.

8.z.5 Measurement Failure Indication

The Measurement Failure Indication procedure allows the NG-RAN node to notify the LMF that the measurements previously requested with the Measurement procedure can no longer be reported.

Figure 25:
FIG. 25 is a schematic diagram of a Measurement Failure Indication.

Upon reception of the MEASUREMENT FAILURE INDICATION message, the LMF shall consider that the indicated measurements have been terminated by the NG-RAN node. A successful operation is shown in Figure 25.

NEXT CHANGE

This message is sent by LMF to request positioning information.

Direction: LMF → NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| Requested SRS Transmission Characteristics | O | | 9.2.x | | YES | ignore |

This message is sent by NG-RAN node to provide positioning information.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| SRS Configuration | O | | 9.2.y | | YES | ignore |
| Criticality Diagnostics | O | | 9.2.2 | | YES | ignore |

This message is sent by NG-RAN node to indicate that the positioning information cannot be provided.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| Cause | M | | 9.2.1 | | YES | ignore |
| Criticality Diagnostics | O | | 9.2.2 | | YES | ignore |

This message is sent by NG-RAN node to indicate that a change in the SRS configuration has occurred.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| SRS Configuration | O | | 9.2.y | | YES | ignore |

NEXT CHANGE

9.1.x  Messages for Measurement Information Transfer Procedures

This message is sent by the LMF to request the NG-RAN node to configure a positioning measurement.

Direction: LMF → NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| Report Characteristics | M | | ENUMERATED (OnDemand, Periodic, ...) | | YES | reject |
| Measurement Periodicity | C-ifReportCharacteristicsPeriodic | | ENUMERATED (120ms, 240ms, 480ms, 640ms, 1024ms, 2048ms, 5120ms, 10240ms, 1min, 6min, 12min, 30min, 60min,...) [FFS] | | YES | reject |
| SRS Configuration | O | | 9.2.y | | YES | ignore |

| Condition | Explanation |
|---|---|
| ifReportCharacteristicsPeriodic | This IE shall be present if the *Report Characteristics* IE is set to the value "Periodic". |

This message is sent by the NG-RAN node to report positioning measurements for the target UE.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| RAN UE Measurement ID | M | | INTEGER (1..15,...) | | YES | reject |
| UL RTOA Measurement | O | | 9.2.z | | YES | reject |
| Criticality Diagnostics | O | | 9.2.11 | | YES | ignore |

This message is sent by the NG-RAN node to report measurement failure.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| Cause | M | | 9.2.10 | | YES | ignore |
| Criticality Diagnostics | O | | 9.2.11 | | YES | ignore |

This message is sent by the NG-RAN node to report positioning measurements for the target UE.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| RAN UE Measurement ID | M | | INTEGER (1..15,...) | | YES | reject |
| UL RTOA Measurement | O | | 9.2.z | | YES | reject |

This message is sent by the LMF to update a previously configured measurement.

Direction: LMF → NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| SRS Configuration | O | | 9.2.y | | YES | ignore |

This message is sent by the LMF to request the NG-RAN node to abort a measurement.

Direction: LMF → NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |

This message is sent by the NG-RAN node to indicate that the previously requested measurements can no longer be reported.

Direction: NG-RAN node → LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | - | |
| LMF UE Measurement ID | M | | INTEGER (1..15,...) | | YES | reject |
| RAN UE Measurement ID | M | | INTEGER (1..15,...) | | YES | reject |
| Cause | M | | 9.2.10 | | YES | ignore |

NEXT CHANGE

9.2.x   Requested SRS Transmission Characteristics

This IE contains the requested SRS configuration for the UE.

[Editor's Note: IE contents are FFS pending RAN2]

| IE/Group Name | Presence | Range | IE Type and Reference | Semantics Description |
|---|---|---|---|---|
| Number Of Transmissions | M | | INTEGER (0..500,...) | The number of periodic SRS transmissions requested. The value of '0' represents an infinite number of SRS transmissions. |
| Bandwidth | M | | INTEGER (1..100,...) | The requested bandwidth of the SRS transmissions, the value of which corresponds to the number of resource blocks requested to be allocated. |
| | | | | |

9.2.y   SRS Configuration

This information element contains the SRS configuration configured by the NG-RAN node for the UE.

[Editor's Note: IE contents are FFS pending RAN2]

| IE/Group Name | Presence | Range | IE Type and Reference | Semantics Description |
|---|---|---|---|---|
| | | | | |

9.2.z   UL RTOA Measurement

This information element contains the uplink RTOA measurement.

[Editor's Note: IE contents are FFS pending RAN2]

| IE/Group Name | Presence | Range | IE Type and Reference | Semantics Description |
|---|---|---|---|---|
| | | | | |

NEXT CHANGE

9.3.3 Elementary Procedure Definitions
-- ASN1START
-- **************************************************************
--
-- Elementary Procedure definitions
--
-- **************************************************************

NRPPA-PDU-Descriptions {
itu-t (0) identified-organization (4) etsi (0) mobileDomain (0)
ngran-access (22) modules (3) nrppa (4) version1 (1) nrppa-PDU-Descriptions (0) }

DEFINITIONS AUTOMATIC TAGS ::=

BEGIN

-- **************************************************************
--
-- IE parameter types from other modules.
--
-- **************************************************************

IMPORTS
    Criticality,
    ProcedureCode,
    NRPPATransactionID

FROM NRPPA-CommonDataTypes

ErrorIndication,
    PrivateMessage,
    E-CIDMeasurementInitiationRequest,
    E-CIDMeasurementInitiationResponse,
    E-CIDMeasurementInitiationFailure,
    E-CIDMeasurementFailureIndication,
    E-CIDMeasurementReport,
    E-CIDMeasurementTerminationCommand,
    OTDOAInformationRequest,
    OTDOAInformationResponse,
    OTDOAInformationFailure,
    PositioningInformationRequest,
    PositioningInformationResponse,
    PositioningInformationFailure,
    PositioningInformationUpdate,
    MeasurementRequest,
    MeasurementResponse,
    MeasurementFailure,
    MeasurementReport,
    MeasurementUpdate,
    MeasurementAbort,
    MeasurementFailureIndication FROM NRPPA-PDU-Contents id-errorIndication,
    id-privateMessage,
    id-e-CIDMeasurementInitiation,
    id-e-CIDMeasurementFailureIndication,

```
        id-e-CIDMeasurementReport,
        id-e-CIDMeasurementTermination,
        id-oTDOAInformationExchange,
        id-positioningInformationExchange,
        id-positioningInformationUpdate,
        id-Measurement,
        id-MeasurementReport,
        id-MeasurementUpdate,
        id-MeasurementAbort,
        id-MeasurementFailureIndication FROM NRPPA-Constants;

-- ************************************************************
--
-- Interface Elementary Procedure Class
--
-- ************************************************************

NRPPA-ELEMENTARY-PROCEDURE ::= CLASS {
        &InitiatingMessage          ,
        &SuccessfulOutcome                                      OPTIONAL,
        &UnsuccessfulOutcome                                    OPTIONAL,
        &procedureCode              ProcedureCode       UNIQUE,
        &criticality                Criticality     DEFAULT ignore
}
WITH SYNTAX {
        INITIATING MESSAGE          &InitiatingMessage
        [SUCCESSFUL OUTCOME         &SuccessfulOutcome]
        [UNSUCCESSFUL OUTCOME       &UnsuccessfulOutcome]
        PROCEDURE CODE                  &procedureCode
        [CRITICALITY                &criticality]
}

-- ************************************************************
--
-- Interface PDU Definition
--
-- ************************************************************

NRPPA-PDU ::= CHOICE {
        initiatingMessage       InitiatingMessage,
        successfulOutcome       SuccessfulOutcome,
        unsuccessfulOutcome     UnsuccessfulOutcome,
        ...
}

InitiatingMessage ::= SEQUENCE {
        procedureCode           NRPPA-ELEMENTARY-PROCEDURE.&procedureCode
        ({NRPPA-ELEMENTARY-PROCEDURES}),
        criticality             NRPPA-ELEMENTARY-PROCEDURE.&criticality
        ({NRPPA-ELEMENTARY-PROCEDURES}{@procedureCode}),
        nrppatransactionID      NRPPATransactionID,
        value                   NRPPA-ELEMENTARY-PROCEDURE.&InitiatingMessage
        ({NRPPA-ELEMENTARY-PROCEDURES}{@procedureCode})
}

SuccessfulOutcome ::= SEQUENCE {
```

```
        procedureCode              NRPPA-ELEMENTARY-PROCEDURE.&procedureCode
        ({NRPPA-ELEMENTARY-PROCEDURES}),
        criticality                NRPPA-ELEMENTARY-PROCEDURE.&criticality
        ({NRPPA-ELEMENTARY-PROCEDURES}{@procedureCode}),
        nrppatransactionID         NRPPATransactionID,
        value                      NRPPA-ELEMENTARY-PROCEDURE.&SuccessfulOutcome
        ({NRPPA-ELEMENTARY-PROCEDURES}{@procedureCode})
}

UnsuccessfulOutcome ::= SEQUENCE {
        procedureCode              NRPPA-ELEMENTARY-PROCEDURE.&procedureCode
        ({NRPPA-ELEMENTARY-PROCEDURES}),
        criticality                NRPPA-ELEMENTARY-PROCEDURE.&criticality
        ({NRPPA-ELEMENTARY-PROCEDURES}{@procedureCode}),
        nrppatransactionID         NRPPATransactionID,
        value                      NRPPA-ELEMENTARY-PROCEDURE.&UnsuccessfulOutcome
        ({NRPPA-ELEMENTARY-PROCEDURES}{@procedureCode})
}

-- *************************************************************
--
-- Interface Elementary Procedure List
--
-- *************************************************************

NRPPA-ELEMENTARY-PROCEDURES NRPPA-ELEMENTARY-PROCEDURE ::= {
        NRPPA-ELEMENTARY-PROCEDURES-CLASS-1                  |
        NRPPA-ELEMENTARY-PROCEDURES-CLASS-2                  ,
        ...
}

NRPPA-ELEMENTARY-PROCEDURES-CLASS-1 NRPPA-ELEMENTARY-PROCEDURE ::= {
        e-CIDMeasurementInitiation      |
        oTDOAInformationExchange            ,
        ...,
        positioningInformationExchange  |
        measurement
}

NRPPA-ELEMENTARY-PROCEDURES-CLASS-2 NRPPA-ELEMENTARY-PROCEDURE ::= {
        e-CIDMeasurementFailureIndication    |
        e-CIDMeasurementReport               |
        e-CIDMeasurementTermination          |
        errorIndication                      |
        privateMessage                       ,
        ...,
        positioningInformationUpdate         |
        measurementReport                    |
        measurementUpdate                    |
        measurementAbort                     |
        measurementFailureIndication
}

-- *************************************************************
--
-- Interface Elementary Procedures
--
-- *************************************************************
```

```
e-CIDMeasurementInitiation NRPPA-ELEMENTARY-PROCEDURE ::= {
        INITIATING MESSAGE          E-CIDMeasurementInitiationRequest
        SUCCESSFUL OUTCOME          E-CIDMeasurementInitiationResponse
        UNSUCCESSFUL OUTCOME        E-CIDMeasurementInitiationFailure
        PROCEDURE CODE              id-e-CIDMeasurementInitiation
        CRITICALITY                 reject
} e-CIDMeasurementFailureIndication NRPPA-ELEMENTARY-PROCEDURE ::= {
        INITIATING MESSAGE          E-CIDMeasurementFailureIndication
        PROCEDURE CODE              id-e-CIDMeasurementFailureIndication
        CRITICALITY                 ignore
} e-CIDMeasurementReport NRPPA-ELEMENTARY-PROCEDURE ::= {
        INITIATING MESSAGE          E-CIDMeasurementReport
        PROCEDURE CODE              id-e-CIDMeasurementReport
        CRITICALITY                 ignore
} e-CIDMeasurementTermination NRPPA-ELEMENTARY-PROCEDURE ::= {
        INITIATING MESSAGE          E-CIDMeasurementTerminationCommand
        PROCEDURE CODE              id-e-CIDMeasurementTermination
        CRITICALITY                 reject
} oTDOAInformationExchange NRPPA-ELEMENTARY-PROCEDURE ::= {
        INITIATING MESSAGE          OTDOAInformationRequest
        SUCCESSFUL OUTCOME          OTDOAInformationResponse
        UNSUCCESSFUL OUTCOME        OTDOAInformationFailure
        PROCEDURE CODE              id-oTDOAInformationExchange
        CRITICALITY                 reject
} errorIndication NRPPA-ELEMENTARY-PROCEDURE ::= {
        INITIATING MESSAGE          ErrorIndication
        PROCEDURE CODE              id-crrorIndication
        CRITICALITY                 ignore
} privateMessage             NRPPA-ELEMENTARY-PROCEDURE ::= {
        INITIATING MESSAGE          PrivateMessage
        PROCEDURE CODE              id-privateMessage
        CRITICALITY                 ignore
} positioningInformationExchange   NRPPA-ELEMENTARY-PROCEDURE ::= {
        INITIATING MESSAGE          PositioningInformationRequest
        SUCCESSFUL OUTCOME          PositioningInformationResponse
        UNSUCCESSFUL OUTCOME        PositioningInformationFailure
        PROCEDURE CODE              id-positioningInformationExchange
        CRITICALITY                 reject
} positioningInformationUpdate   NRPPA-ELEMENTARY-PROCEDURE ::= {
        INITIATING MESSAGE          PositioningInformationUpdate
        PROCEDURE CODE              id-positioningInformationUpdate
        CRITICALITY                 ignore
```

}

```
measurement NRPPA-ELEMENTARY-PROCEDURE ::= {
    INITIATING MESSAGE          MeasurementRequest
    SUCCESSFUL OUTCOME          MeasurementResponse
    UNSUCCESSFUL OUTCOME        MeasurementFailure
    PROCEDURE CODE              id-Measurement
    CRITICALITY                 reject
} measurementReport NRPPA-ELEMENTARY-PROCEDURE ::= {
    INITIATING MESSAGE          MeasurementReport
    PROCEDURE CODE              id-MeasurementReport
    CRITICALITY                 ignore
} measurementUpdate NRPPA-ELEMENTARY-PROCEDURE ::= {
    INITIATING MESSAGE          MeasurementUpdate
    PROCEDURE CODE              id-MeasurementUpdate
    CRITICALITY                 ignore
} measurementAbort  NRPPA-ELEMENTARY-PROCEDURE ::= {
    INITIATING MESSAGE          MeasurementAbort
    PROCEDURE CODE              id-MeasurementAbort
    CRITICALITY                 ignore
} measurementFailureIndication    NRPPA-ELEMENTARY-PROCEDURE ::= {
    INITIATING MESSAGE          MeasurementFailureIndication
    PROCEDURE CODE              id-MeasurementFailureIndication
    CRITICALITY                 ignore
}

END
-- ASN1STOP
```

NEXT CHANGE
9.3.4 PDU Definitions
-- ASN1START
-- **************************************************************
--
-- PDU definitions for NRPPa.
--
-- **************************************************************

NRPPA-PDU-Contents {
itu-t (0) identified-organization (4) etsi (0) mobileDomain (0)
ngran-access (22) modules (3) nrppa (4) version1 (1) nrppa-PDU-Contents (1) }

DEFINITIONS AUTOMATIC TAGS ::=

BEGIN

-- **************************************************************
--
-- IE parameter types from other modules.
--
-- **************************************************************

IMPORTS

Cause,
    CriticalityDiagnostics,
    E-CID-MeasurementResult,
    OTDOACells,
    OTDOA-Information-Item,
    Measurement-ID,
    MeasurementPeriodicity,
    MeasurementQuantities,
    ReportCharacteristics,
    RequestedSRSTransmissionCharacteristics,
    Cell-Portion-ID,
    OtherRATMeasurementQuantities,
    OtherRATMeasurementResult,
    WLANMeasurementQuantities,
    WLANMeasurementResult,
    SRSConfiguration,
    UL-RTOAMeasurement FROM NRPPA-IEs PrivateIE-Container{},
    ProtocolExtensionContainer{},
    ProtocolIE-Container{},
    ProtocolIE-ContainerList{},
    ProtocolIE-Single-Container{},
    NRPPA-PRIVATE-IES,
    NRPPA-PROTOCOL-EXTENSION,
    NRPPA-PROTOCOL-IES
FROM NRPPA-Containers maxnoOTDOAtypes,
    id-Cause,
    id-CriticalityDiagnostics,
    id-LMF-UE-Measurement-ID,
    id-OTDOACells,
    id-OTDOA-Information-Type-Group,
    id-OTDOA-Information-Type-Item,
    id-ReportCharacteristics,
    id-MeasurementPeriodicity,
    id-MeasurementQuantities,
    id-RAN-UE-Measurement-ID,
    id-E-CID-MeasurementResult,
    id-RequestedSRSTransmissionCharacteristics,
    id-Cell-Portion-ID,
    id-OtherRATMeasurementQuantities,
    id-OtherRATMeasurementResult,
    id-WLANMeasurementQuantities,
    id-WLANMeasurementResult,
    id-SRSConfiguration,
    id-UL-RTOAMeasurement FROM NRPPA-Constants;

-- ************************************************************
--
-- E-CID MEASUREMENT INITIATION REQUEST
--

```
-- ****************************************************

E-CIDMeasurementInitiationRequest ::= SEQUENCE {
        protocolIEs        ProtocolIE-Container       {{E-CIDMeasurementInitiationRequest-IEs}},
        ...
}

E-CIDMeasurementInitiationRequest-IEs NRPPA-PROTOCOL-IES ::= {
        { ID id-LMF-UE-Measurement-ID           CRITICALITY reject      TYPE Measurement-ID
                                PRESENCE mandatory}|
        { ID id-ReportCharacteristics           CRITICALITY reject      TYPE
ReportCharacteristics                           PRESENCE mandatory}|
        { ID id-MeasurementPeriodicity          CRITICALITY reject      TYPE
MeasurementPeriodicity                          PRESENCE conditional}|
-- The IE shall be present if the Report Characteritics IE is set to "periodic" --
        { ID id-MeasurementQuantities           CRITICALITY reject      TYPE
MeasurementQuantities                           PRESENCE mandatory}|
        { ID id-OtherRATMeasurementQuantities CRITICALITY ignore        TYPE
OtherRATMeasurementQuantities  PRESENCE optional}|
        { ID id-WLANMeasurementQuantities       CRITICALITY ignore      TYPE
WLANMeasurementQuantities                       PRESENCE optional},
        ...
}

-- ****************************************************
--
-- E-CID MEASUREMENT INITIATION RESPONSE
--
-- ****************************************************

E-CIDMeasurementInitiationResponse ::= SEQUENCE {
        protocolIEs        ProtocolIE-Container       {{E-CIDMeasurementInitiationResponse-IEs}},
        ...
}

E-CIDMeasurementInitiationResponse-IEs NRPPA-PROTOCOL-IES ::= {
        { ID id-LMF-UE-Measurement-ID       CRITICALITY reject      TYPE Measurement-ID
                        PRESENCE mandatory}|
        { ID id-RAN-UE-Measurement-ID       CRITICALITY reject      TYPE Measurement-ID
                        PRESENCE mandatory}|
        { ID id-E-CID-MeasurementResult     CRITICALITY ignore      TYPE E-CID-MeasurementResult
                PRESENCE optional}|
        { ID id-CriticalityDiagnostics      CRITICALITY ignore      TYPE CriticalityDiagnostics
                PRESENCE optional}|
        { ID id-Cell-Portion-ID                         CRITICALITY ignore      TYPE Cell-Portion-ID
                        PRESENCE optional}|
        { ID id-OtherRATMeasurementResult   CRITICALITY ignore      TYPE
OtherRATMeasurementResult           PRESENCE optional}|
        { ID id-WLANMeasurementResult       CRITICALITY ignore      TYPE WLANMeasurementResult
                PRESENCE optional},
        ...
}

-- ****************************************************
--
-- E-CID MEASUREMENT INITIATION FAILURE
--
-- ****************************************************

E-CIDMeasurementInitiationFailure ::= SEQUENCE {
```

```
        protocolIEs              ProtocolIE-Container        {{E-
CIDMeasurementInitiationFailure-IEs}},
            ...
}

E-CIDMeasurementInitiationFailure-IEs NRPPA-PROTOCOL-IES ::= {
        { ID id-LMF-UE-Measurement-ID    CRITICALITY reject    TYPE Measurement-ID
                PRESENCE mandatory}|
        { ID id-Cause                                CRITICALITY ignore    TYPE Cause
                        PRESENCE mandatory}|
        { ID id-CriticalityDiagnostics    CRITICALITY ignore    TYPE CriticalityDiagnostics
                PRESENCE optional},
            ...
}

-- ************************************************************
--
-- E-CID MEASUREMENT FAILURE INDICATION
--
-- ************************************************************

E-CIDMeasurementFailureIndication ::= SEQUENCE {
        protocolIEs              ProtocolIE-Container        {{E-
CIDMeasurementFailureIndication-IEs}},
            ...
}

E-CIDMeasurementFailureIndication-IEs NRPPA-PROTOCOL-IES ::= {
        { ID id-LMF-UE-Measurement-ID    CRITICALITY reject    TYPE Measurement-ID
                PRESENCE mandatory}|
        { ID id-RAN-UE-Measurement-ID    CRITICALITY reject    TYPE Measurement-ID
                PRESENCE mandatory}|
        { ID id-Cause                                CRITICALITY ignore    TYPE Cause
                        PRESENCE mandatory},
            ...
}

-- ************************************************************
--
-- E-CID MEASUREMENT REPORT
--
-- ************************************************************

E-CIDMeasurementReport ::= SEQUENCE {
        protocolIEs              ProtocolIE-Container        {{E-
CIDMeasurementReport-IEs}},
            ...
}

E-CIDMeasurementReport-IEs NRPPA-PROTOCOL-IES ::= {
        { ID id-LMF-UE-Measurement-ID    CRITICALITY reject    TYPE Measurement-ID
                PRESENCE mandatory}|
        { ID id-RAN-UE-Measurement-ID    CRITICALITY reject    TYPE Measurement-ID
                PRESENCE mandatory}|
        { ID id-E-CID-MeasurementResult    CRITICALITY ignore    TYPE E-CID-MeasurementResult
                PRESENCE mandatory}|
```

{ ID id-Cell-Portion-ID    CRITICALITY ignore  TYPE Cell-Portion-ID
    PRESENCE optional},
   ...
}

-- ****************************************************************
--
-- E-CID MEASUREMENT TERMINATION
--
-- ****************************************************************

E-CIDMeasurementTerminationCommand ::= SEQUENCE {
  protocolIEs       ProtocolIE-Container    {{E-CIDMeasurementTerminationCommand-IEs}},
   ...
}

E-CIDMeasurementTerminationCommand-IEs NRPPA-PROTOCOL-IES ::= {
  { ID id-LMF-UE-Measurement-ID  CRITICALITY reject  TYPE Measurement-ID
    PRESENCE mandatory}|
  { ID id-RAN-UE-Measurement-ID  CRITICALITY reject  TYPE Measurement-ID
    PRESENCE mandatory},
   ...
}

-- ****************************************************************
--
-- OTDOA INFORMATION REQUEST
--
-- ****************************************************************

OTDOAInformationRequest ::= SEQUENCE {
  protocolIEs  ProtocolIE-Container  {{OTDOAInformationRequest-IEs}},
   ...
}

OTDOAInformationRequest-IEs NRPPA-PROTOCOL-IES ::= {
  { ID id-OTDOA-Information-Type-Group  CRITICALITY reject  TYPE OTDOA-Information-Type  PRESENCE mandatory},
   ...
}

OTDOA-Information-Type ::= SEQUENCE (SIZE(1..maxnoOTDOAtypes)) OF ProtocolIE-Single-Container {
{ OTDOA-Information-TypeIEs} }

OTDOA-Information-TypeIEs  NRPPA-PROTOCOL-IES ::= {
  { ID id-OTDOA-Information-Type-Item  CRITICALITY reject  TYPE OTDOA-Information-Type-Item  PRESENCE mandatory},
   ...
}

OTDOA-Information-Type-Item ::= SEQUENCE {
  oTDOA-Information-Type-Item  OTDOA-Information-Item,
  iE-Extensions       ProtocolExtensionContainer { { OTDOA-Information-Type-ItemExtIEs} } OPTIONAL,
   ...
}

OTDOA-Information-Type-ItemExtIEs NRPPA-PROTOCOL-EXTENSION ::= {

```
    ...
}

-- ******************************************************************
--
-- OTDOA INFORMATION RESPONSE
--
-- ******************************************************************

OTDOAInformationResponse ::= SEQUENCE {
        protocolIEs       ProtocolIE-Container       {{OTDOAInformationResponse-IEs}},
        ...
}

OTDOAInformationResponse-IEs NRPPA-PROTOCOL-IES ::= {
        { ID id-OTDOACells                                    CRITICALITY ignore    TYPE
OTDOACells                     PRESENCE mandatory}|
        { ID id-CriticalityDiagnostics               CRITICALITY ignore    TYPE
CriticalityDiagnostics         PRESENCE optional},
        ...
}

-- ******************************************************************
--
-- OTDOA INFORMATION FAILURE
--
-- ******************************************************************

OTDOAInformationFailure ::= SEQUENCE {
        protocolIEs                            ProtocolIE-Container
        {{OTDOAInformationFailure-IEs}},
        ...
}

OTDOAInformationFailure-IEs NRPPA-PROTOCOL-IES ::= {
        { ID id-Cause                                         CRITICALITY ignore    TYPE Cause
                         PRESENCE mandatory}|
        { ID id-CriticalityDiagnostics               CRITICALITY ignore    TYPE
CriticalityDiagnostics         PRESENCE optional},
        ...
}

-- ******************************************************************
--
-- ERROR INDICATION
--
-- ******************************************************************

ErrorIndication ::= SEQUENCE {
        protocolIEs       ProtocolIE-Container       {{ErrorIndication-IEs}},
        ...
}

ErrorIndication-IEs NRPPA-PROTOCOL-IES ::= {

{ ID id-Cause                                         CRITICALITY ignore    TYPE Cause
                         PRESENCE optional}|
        { ID id-CriticalityDiagnostics          CRITICALITY ignore    TYPE CriticalityDiagnostics
        PRESENCE optional},
```

...
}

-- ************************************************************
--
-- PRIVATE MESSAGE
--
-- ************************************************************

PrivateMessage ::= SEQUENCE {
        privateIEs          PrivateIE-Container {{PrivateMessage-IEs}},
        ...
}

PrivateMessage-IEs NRPPA-PRIVATE-IES ::= {
        ...
}

-- ************************************************************
--
-- POSITIONING INFORMATION REQUEST
--
-- ************************************************************

PositioningInformationRequest ::= SEQUENCE {
        protocolIEs         ProtocolIE-Container        {{PositioningInformationRequest-IEs}},
        ...
}

PositioningInformationRequest-IEs NRPPA-PROTOCOL-IES ::= {
        { ID id-RequestedSRSTransmissionCharacteristics        CRITICALITY ignore        TYPE RequestedSRSTransmissionCharacteristics        PRESENCE optional},
        ...
}

-- ************************************************************
--
-- POSITIONING INFORMATION RESPONSE
--
-- ************************************************************

PositioningInformationResponse ::= SEQUENCE {
        protocolIEs         ProtocolIE-Container        {{PositioningInformationResponse-IEs}},
        ...
}

PositioningInformationResponse-IEs NRPPA-PROTOCOL-IES ::= {
        { ID id-SRSConfiguration              CRITICALITY ignore        TYPE SRSConfiguration
              PRESENCE optional}|
        { ID id-CriticalityDiagnostics        CRITICALITY ignore        TYPE CriticalityDiagnostics
              PRESENCE optional},
        ...
}

-- ************************************************************
--
-- POSITIONING INFORMATION FAILURE
--
-- ************************************************************

```
PositioningInformationFailure ::= SEQUENCE {
        protocolIEs                             ProtocolIE-Container
        {{PositioningInformationFailure-IEs}},
        ...
}

PositioningInformationFailure-IEs NRPPA-PROTOCOL-IES ::= {
        { ID id-Cause                           CRITICALITY ignore      TYPE Cause
                        PRESENCE mandatory}|
        { ID id-CriticalityDiagnostics          CRITICALITY ignore      TYPE CriticalityDiagnostics
                PRESENCE optional},
        ...
}

-- ***************************************************************
--
-- POSITIONING INFORMATION UPDATE
--
-- ***************************************************************

PositioningInformationUpdate ::= SEQUENCE {
        protocolIEs     ProtocolIE-Container    {{PositioningInformationUpdate-IEs}},
        ...
}

PositioningInformationUpdate-IEs NRPPA-PROTOCOL-IES ::= {
        { ID id-SRSConfiguration                CRITICALITY ignore      TYPE SRSConfiguration
                PRESENCE optional},
        ...
}

-- ***************************************************************
--
-- MEASUREMENT REQUEST
--
-- ***************************************************************

MeasurementRequest ::= SEQUENCE {
        protocolIEs     ProtocolIE-Container    {{MeasurementRequest-IEs}},
        ...
}

MeasurementRequest-IEs NRPPA-PROTOCOL-IES ::= {
        { ID id-LMF-UE-Measurement-ID           CRITICALITY reject      TYPE Measurement-ID
                        PRESENCE mandatory}|
        { ID id-ReportCharacteristics           CRITICALITY reject      TYPE
ReportCharacteristics           PRESENCE mandatory}|
        { ID id-MeasurementPeriodicity          CRITICALITY reject      TYPE
MeasurementPeriodicity          PRESENCE conditional}|
-- The IE shall be present if the Report Characteritics IE is set to "periodic" --
        { ID id-SRSConfiguration                CRITICALITY ignore      TYPE SRSConfiguration
                PRESENCE optional},
        ...
}

-- ***************************************************************
--
-- MEASUREMENT RESPONSE
--
-- ***************************************************************
```

```
MeasurementResponse ::= SEQUENCE {
        protocolIEs         ProtocolIE-Container        {{MeasurementResponse-IEs}},
        ...
}

MeasurementResponse-IEs NRPPA-PROTOCOL-IES ::= {
        { ID id-LMF-UE-Measurement-ID      CRITICALITY reject     TYPE Measurement-ID
                PRESENCE mandatory}|
        { ID id-RAN-UE-Measurement-ID      CRITICALITY reject     TYPE Measurement-ID
                PRESENCE mandatory}|
        { ID id-UL-RTOAMeasurement                   CRITICALITY reject     TYPE UL-
RTOAMeasurement            PRESENCE optional}|
        { ID id-CriticalityDiagnostics     CRITICALITY ignore     TYPE CriticalityDiagnostics
                PRESENCE optional},
        ...
}

-- ************************************************************
--
-- MEASUREMENT FAILURE
--
-- ************************************************************

MeasurementFailure ::= SEQUENCE {
        protocolIEs                        ProtocolIE-Container
        {{MeasurementFailure-IEs}},
        ...
}

MeasurementFailure-IEs NRPPA-PROTOCOL-IES ::= {
        { ID id-LMF-UE-Measurement-ID      CRITICALITY reject     TYPE Measurement-ID
                PRESENCE mandatory}|
        { ID id-Cause                      CRITICALITY ignore     TYPE Cause
                        PRESENCE mandatory}|
        { ID id-CriticalityDiagnostics     CRITICALITY ignore     TYPE CriticalityDiagnostics
                PRESENCE optional},
        ...
}

-- ************************************************************
--
-- MEASUREMENT REPORT
--
-- ************************************************************

MeasurementReport ::= SEQUENCE {
        protocolIEs         ProtocolIE-Container        {{MeasurementReport-IEs}},
        ...
}

MeasurementReport-IEs NRPPA-PROTOCOL-IES ::= {
        { ID id-LMF-UE-Measurement-ID      CRITICALITY reject     TYPE Measurement-ID
                PRESENCE mandatory}|
        { ID id-RAN-UE-Measurement-ID      CRITICALITY reject     TYPE Measurement-ID
                PRESENCE mandatory}|
        { ID id-UL-RTOAMeasurement                   CRITICALITY reject     TYPE UL-
RTOAMeasurement            PRESENCE optional},
        ...
}
```

```
-- ****************************************************************
--
-- MEASUREMENT UPDATE
--
-- ****************************************************************

MeasurementUpdate ::= SEQUENCE {
    protocolIEs     ProtocolIE-Container     {{MeasurementUpdate-IEs}},
    ...
}

MeasurementUpdate-IEs NRPPA-PROTOCOL-IES ::= {
    { ID id-LMF-UE-Measurement-ID      CRITICALITY reject     TYPE Measurement-ID
            PRESENCE mandatory}|
    { ID id-SRSConfiguration           CRITICALITY ignore     TYPE SRSConfiguration
        PRESENCE optional},
    ...
}

-- ****************************************************************
--
-- MEASUREMENT ABORT
--
-- ****************************************************************

MeasurementAbort ::= SEQUENCE {
    protocolIEs     ProtocolIE-Container     {{MeasurementAbort-IEs}},
    ...
}

MeasurementAbort-IEs NRPPA-PROTOCOL-IES ::= {
    { ID id-LMF-UE-Measurement-ID      CRITICALITY reject     TYPE Measurement-ID
            PRESENCE mandatory},
    ...
}

-- ****************************************************************
--
-- MEASUREMENT FAILURE INDICATION
--
-- ****************************************************************

MeasurementFailureIndication ::= SEQUENCE {
    protocolIEs                        ProtocolIE-Container
    {{MeasurementFailureIndication-IEs}},
    ...
}

MeasurementFailureIndication-IEs NRPPA-PROTOCOL-IES ::= {
    { ID id-LMF-UE-Measurement-ID      CRITICALITY reject     TYPE Measurement-ID
            PRESENCE mandatory}|
    { ID id-RAN-UE-Measurement-ID      CRITICALITY reject     TYPE Measurement-ID
            PRESENCE mandatory}|
    { ID id-Cause                      CRITICALITY ignore     TYPE Cause
            PRESENCE mandatory},
    ...
}

END
```

-- ASN1STOP

NEXT CHANGE
9.3.5 Information Element definitions
-- ASN1START
-- **************************************************
--
-- Information Element Definitions
--
-- **************************************************

NRPPA-IEs {
itu-t (0) identified-organization (4) etsi (0) mobileDomain (0)
ngran-access (22) modules (3) nrppa (4) version1 (1) nrppa-IEs (2) }

DEFINITIONS AUTOMATIC TAGS ::=

BEGIN

IMPORTS id-MeasurementQuantities-Item,
       maxCellinRANnode,
       maxCellReport,
       maxNrOfErrors,
       maxNoMeas,
       maxnoOTDOAtypes,
       maxServCell,
       id-OtherRATMeasurementQuantities-Item,
       id-WLANMeasurementQuantities-Item,
       maxGERANMeas,
       maxUTRANMcas,
       maxWLANchannels,
       maxnoFreqHoppingBandsMinusOne,
       id-TDD-Config-EUTRA-Item FROM NRPPA-Constants Criticality,
       NRPPATransactionID,
       ProcedureCode,
       ProtocolIE-ID,
       TriggeringMessage FROM NRPPA-CommonDataTypes ProtocolExtensionContainer{ },
       ProtocolIE-Single-Container{ },

NRPPA-PROTOCOL-EXTENSION,
       NRPPA-PROTOCOL-IES

FROM NRPPA-Containers;

-- A

-- B

BCCH ::= INTEGER (0..1023, ...)

```
BSSID ::= OCTET STRING (SIZE(6))

-- C

Cause ::= CHOICE {
        radioNetwork        CauseRadioNetwork,
        protocol            CauseProtocol,
        misc                CauseMisc,
        cause-Extension     ProtocolIE-Single-Container {{ Cause-ExtensionIE }}
}

Cause-ExtensionIE NRPPA-PROTOCOL-IES ::= {
        ...
}

CauseMisc ::= ENUMERATED {
        unspecified,
        ...
}

CauseProtocol ::= ENUMERATED {
        transfer-syntax-error,
        abstract-syntax-error-reject,
        abstract-syntax-error-ignore-and-notify,
        message-not-compatible-with-receiver-state,
        semantic-error,
        unspecified,
        abstract-syntax-error-falsely-constructed-message,
        ...
}

CauseRadioNetwork ::= ENUMERATED {
        unspecified,
        requested-item-not-supported,
        requested-item-temporarily-not-available,
        ...

}

Cell-Portion-ID ::= INTEGER (0..4095,...)

CGI-EUTRA ::= SEQUENCE {
        pLMN-Identity               PLMN-Identity,
        eUTRAcellIdentifier         EUTRACellIdentifier,
        iE-Extensions               ProtocolExtensionContainer { {CGI-EUTRA-ExtIEs} } OPTIONAL,
        ...
}

CGI-EUTRA-ExtIEs NRPPA-PROTOCOL-EXTENSION ::= {
        ...
}

CPLength-EUTRA ::= ENUMERATED {
        normal,
        extended,
        ...
}

CriticalityDiagnostics ::= SEQUENCE {
```

```
        procedureCode              ProcedureCode
OPTIONAL,
        triggeringMessage          TriggeringMessage              OPTIONAL,
        procedureCriticality       Criticality                    OPTIONAL,
        nrppatransactionID         NRPPATransactionID                       OPTIONAL,
        iEsCriticalityDiagnostics  CriticalityDiagnostics-IE-List  OPTIONAL,
        iE-Extensions              ProtocolExtensionContainer { {CriticalityDiagnostics-ExtIEs}
}       OPTIONAL,
        ...
}

CriticalityDiagnostics-ExtIEs NRPPA-PROTOCOL-EXTENSION ::= {
        ...
}

CriticalityDiagnostics-IE-List ::= SEQUENCE (SIZE (1..maxNrOfErrors)) OF
        SEQUENCE {
                iECriticality      Criticality,
                iE-ID              ProtocolIE-ID,
                typeOfError        TypeOfError,
                iE-Extensions      ProtocolExtensionContainer { {CriticalityDiagnostics-IE-List-
ExtIEs} } OPTIONAL,
                ...
}

CriticalityDiagnostics-IE-List-ExtIEs NRPPA-PROTOCOL-EXTENSION ::= {
        ...
}

-- D

DL-Bandwidth-EUTRA ::= ENUMERATED {
        bw6,
        bw15,
        bw25,
        bw50,
        bw75,
        bw100,
        ...
}

-- E

E-CID-MeasurementResult ::= SEQUENCE {
        servingCell-ID             NG-RAN-CGI,
        servingCellTAC             TAC,
        nG-RANAccessPointPosition  NG-RANAccessPointPosition   OPTIONAL,
        measuredResults            MeasuredResults                          OPTIONAL,
        iE-Extensions              ProtocolExtensionContainer { { E-CID-MeasurementResult-
ExtIEs} } OPTIONAL,
        ...
}

E-CID-MeasurementResult-ExtIEs NRPPA-PROTOCOL-EXTENSION ::= {
        ...
}

EUTRACellIdentifier ::= BIT STRING (SIZE (28))
```

EARFCN ::= INTEGER (0..262143, ...)

-- F

-- G

-- H

HESSID ::= OCTET STRING (SIZE(6))

-- I

-- J

-- K

-- L

-- M

Measurement-ID ::= INTEGER (1..15, ...)

MeasurementPeriodicity ::= ENUMERATED {
    ms120,
    ms240,
    ms480,
    ms640,
    ms1024,
    ms2048,
    ms5120,
    ms10240,
    min1,
    min6,
    min12,
    min30,
    min60,
    ...
}

MeasurementQuantities ::= SEQUENCE (SIZE (1.. maxNoMeas)) OF ProtocolIE-Single-Container { {MeasurementQuantities-ItemIEs} }

MeasurementQuantities-ItemIEs NRPPA-PROTOCOL-IES ::= {
    { ID id-MeasurementQuantities-Item    CRITICALITY reject    TYPE MeasurementQuantities-Item    PRESENCE mandatory}
}

MeasurementQuantities-Item ::= SEQUENCE {
    measurementQuantitiesValue    MeasurementQuantitiesValue,
    iE-Extensions    ProtocolExtensionContainer { {MeasurementQuantitiesValue-ExtIEs} } OPTIONAL,
    ...
}

MeasurementQuantitiesValue-ExtIEs NRPPA-PROTOCOL-EXTENSION ::= {
    ...
}

MeasurementQuantitiesValue ::= ENUMERATED {

```
        cell-ID,
        angleOfArrival,
        timingAdvanceType1,
        timingAdvanceType2,
        rSRP,
        rSRQ,
        ...
}

MeasuredResults ::= SEQUENCE (SIZE (1.. maxNoMeas)) OF MeasuredResultsValue

MeasuredResultsValue ::= CHOICE {
        valueAngleOfArrival-EUTRA           INTEGER (0..719),
        valueTimingAdvanceType1-EUTRA       INTEGER (0..7690),
        valueTimingAdvanceType2-EUTRA       INTEGER (0..7690),
        resultRSRP-EUTRA                    ResultRSRP-EUTRA,
        resultRSRQ-EUTRA                    ResultRSRQ-EUTRA,
        measuredResultsValue-Extension      ProtocolIE-Single-Container {{
MeasuredResultsValue-ExtensionIE }}
}

MeasuredResultsValue-ExtensionIE NRPPA-PROTOCOL-IES ::= {
        ...
}

-- N

NarrowBandIndex ::= INTEGER (0..15,...)

NG-RANAccessPointPosition ::= SEQUENCE {
        latitudeSign            ENUMERATED {north, south},
        latitude                INTEGER (0..8388607),
        longitude               INTEGER (-8388608..8388607),
        directionOfAltitude     ENUMERATED {height, depth},
        altitude                INTEGER (0..32767),
        uncertaintySemi-major   INTEGER (0..127),
        uncertaintySemi-minor   INTEGER (0..127),
        orientationOfMajorAxis  INTEGER (0..179),
        uncertaintyAltitude     INTEGER (0..127),
        confidence              INTEGER (0..100),
        iE-Extensions           ProtocolExtensionContainer { { NG-RANAccessPointPosition-
ExtIEs} } OPTIONAL,
        ...
}

NG-RANAccessPointPosition-ExtIEs NRPPA-PROTOCOL-EXTENSION ::= {
        ...
}

NG-RAN-CGI ::= SEQUENCE {
        pLMN-Identity           PLMN-Identity,
        nG-RANcell              NG-RANCell,
        iE-Extensions           ProtocolExtensionContainer { {NG-RAN-CGI-ExtIEs} }
OPTIONAL,
        ...
}

NG-RAN-CGI-ExtIEs NRPPA-PROTOCOL-EXTENSION ::= {
        ...
}
```

```
NG-RANCell ::= CHOICE {
    eUTRA-CellID        EUTRACellIdentifier,
    nR-CellID           NRCellIdentifier,
    nG-RANCell-Extension                ProtocolIE-Single-Container {{ NG-RANCell-ExtensionIE }}
}

NG-RANCell-ExtensionIE NRPPA-PROTOCOL-IES ::= {
    ...
}

NRCellIdentifier ::= BIT STRING (SIZE (36))

NumberOfAntennaPorts-EUTRA ::= ENUMERATED {
            n1-or-n2,
            n4,
            ...
}

NumberOfDlFrames-EUTRA ::= ENUMERATED {
            sf1,
            sf2,
            sf4,
            sf6,
            ...
}

NumberOfDlFrames-Extended-EUTRA ::= INTEGER (1..160,...)

NumberOfFrequencyHoppingBands ::= ENUMERATED {
    twobands,
    fourbands,
    ...
}

-- O

OTDOACells ::= SEQUENCE (SIZE (1.. maxCellinRANnode)) OF SEQUENCE {
    oTDOACellInfo                       OTDOACell-Information,
    iE-Extensions                       ProtocolExtensionContainer { {OTDOACells-ExtIEs} } OPTIONAL,
    ...
}

OTDOACells-ExtIEs NRPPA-PROTOCOL-EXTENSION ::= {
    ...
}

OTDOACell-Information ::= SEQUENCE (SIZE (1..maxnoOTDOAtypes)) OF OTDOACell-Information-Item OTDOACell-Information-Item ::= CHOICE {
    pCI-EUTRA                           PCI-EUTRA,
    cGI-EUTRA                           CGI-EUTRA,
    tAC                                 TAC,
    eARFCN                              EARFCN,
    pRS-Bandwidth-EUTRA                 PRS-Bandwidth-EUTRA,
    pRS-ConfigurationIndex-EUTRA        PRS-ConfigurationIndex-EUTRA,
    cPLength-EUTRA                      CPLength-EUTRA,
    numberOfDlFrames-EUTRA              NumberOfDlFrames-EUTRA,
    numberOfAntennaPorts-EUTRA          NumberOfAntennaPorts-EUTRA,
```

```
        sFNInitialisationTime-EUTRA              SFNInitialisationTime-EUTRA,
        nG-RANAccessPointPosition                NG-RANAccessPointPosition,
        pRSMutingConfiguration-EUTRA             PRSMutingConfiguration-EUTRA,
        prsid-EUTRA                                  PRS-ID-EUTRA,
        tpid-EUTRA                                   TP-ID-EUTRA,
        tpType-EUTRA                                 TP-Type-EUTRA,
        numberOfDlFrames-Extended-EUTRA          NumberOfDlFrames-Extended-EUTRA,
        crsCPlength-EUTRA                            CPLength-EUTRA,
        dL-Bandwidth-EUTRA                           DL-Bandwidth-EUTRA,
        pRSOccasionGroup-EUTRA                       PRSOccasionGroup-EUTRA,
        pRSFrequencyHoppingConfiguration-EUTRA   PRSFrequencyHoppingConfiguration-EUTRA,
        oTDOACell-Information-Item-Extension     ProtocolIE-Single-Container {{ OTDOACell-
Information-Item-ExtensionIE }}
}

OTDOACell-Information-Item-ExtensionIE NRPPA-PROTOCOL-IES ::= {
        { ID id-TDD-Config-EUTRA-Item       CRITICALITY     ignore TYPE TDD-Config-EUTRA-Item
            PRESENCE  optional },
        ...
}

OTDOA-Information-Item ::= ENUMERATED {
            pci,
            cGI,
            tac,
            earfcn,
            prsBandwidth,
            prsConfigIndex,
            cpLength,
            noDlFrames,
            noAntennaPorts,
            sFNInitTime,
            nG-RANAccessPointPosition,
            prsmutingconfiguration,
            prsid,
            tpid,
            tpType,
            crsCPlength,
            dlBandwidth,
            multipleprsConfigurationsperCell,
            prsOccasionGroup,
            prsFrequencyHoppingConfiguration,
            ...,
            tddConfig
}

OtherRATMeasurementQuantities ::= SEQUENCE (SIZE (0.. maxNoMeas)) OF ProtocolIE-Single-Container {
{OtherRATMeasurementQuantities-ItemIEs} }

OtherRATMeasurementQuantities-ItemIEs NRPPA-PROTOCOL-IES ::= {
        { ID id-OtherRATMeasurementQuantities-Item   CRITICALITY reject      TYPE
OtherRATMeasurementQuantities-Item PRESENCE mandatory}}

OtherRATMeasurementQuantities-Item ::= SEQUENCE {
        otherRATMeasurementQuantitiesValue           OtherRATMeasurementQuantitiesValue,
        iE-Extensions                                ProtocolExtensionContainer { {
OtherRATMeasurementQuantitiesValue-ExtIEs} } OPTIONAL,
        ...
}
```

```
OtherRATMeasurementQuantitiesValue-ExtIEs NRPPA-PROTOCOL-EXTENSION ::= {
      ...
}

OtherRATMeasurementQuantitiesValue ::= ENUMERATED {
      gcran,
      utran,
      ...
}

OtherRATMeasurementResult ::= SEQUENCE (SIZE (1.. maxNoMeas)) OF OtherRATMeasuredResultsValue OtherRATMeasuredResultsValue ::= CHOICE {
      resultGERAN                                            ResultGERAN,
      resultUTRAN                                            ResultUTRAN,
      otherRATMeasuredResultsValue-Extension                 ProtocolIE-Single-Container {{
OtherRATMeasuredResultsValue-ExtensionIE }}
}

OtherRATMeasuredResultsValue-ExtensionIE NRPPA-PROTOCOL-IES ::= {
      ...
}

-- P

PCI-EUTRA ::= INTEGER (0..503, ...)

PhysCellIDGERAN ::= INTEGER (0..63, ...)

PhysCellIDUTRA-FDD ::= INTEGER (0..511, ...)

PhysCellIDUTRA-TDD ::= INTEGER (0..127, ...)

PLMN-Identity ::= OCTET STRING (SIZE(3))

PRS-Bandwidth-EUTRA ::= ENUMERATED {
            bw6,
            bw15,
            bw25,
            bw50,
            bw75,
            bw100,
            ...
}

PRS-ConfigurationIndex-EUTRA ::= INTEGER (0..4095, ...)

PRS-ID-EUTRA       ::= INTEGER (0..4095, ...)

PRSMutingConfiguration-EUTRA ::= CHOICE {
      two                                                    BIT STRING (SIZE
(2)),
      four                                                   BIT STRING (SIZE
(4)),
      eight                                                  BIT STRING (SIZE
(8)),
      sixteen                                                BIT STRING (SIZE
(16)),
```

```
        thirty-two                                              BIT STRING (SIZE
(32)),
        sixty-four                                              BIT STRING (SIZE
(64)),
        one-hundred-and-twenty-eight                  BIT STRING (SIZE (128)),
        two-hundred-and-fifty-six                     BIT STRING (SIZE (256)),
        five-hundred-and-twelve                       BIT STRING (SIZE
(512)),
        one-thousand-and-twenty-four                  BIT STRING (SIZE (1024)),
        pRSMutingConfiguration-EUTRA-Extension        ProtocolIE-Single-Container {{
PRSMutingConfiguration-EUTRA-ExtensionIE }}
}

PRSMutingConfiguration-EUTRA-ExtensionIE NRPPA-PROTOCOL-IES ::= {
        ...
}

PRSOccasionGroup-EUTRA ::= ENUMERATED {
        og2,
        og4,
        og8,
        og16,
        og32,
        og64,
        og128,
        ...
}

PRSFrequencyHoppingConfiguration-EUTRA ::= SEQUENCE {
        noOfFreqHoppingBands        NumberOfFrequencyHoppingBands,
        bandPositions               SEQUENCE(SIZE (1..maxnoFreqHoppingBandsMinusOne)) OF
NarrowBandIndex,
        iE-Extensions               ProtocolExtensionContainer { {
PRSFrequencyHoppingConfiguration-EUTRA-Item-IEs} } OPTIONAL,
        ...
}

PRSFrequencyHoppingConfiguration-EUTRA-Item-IEs NRPPA-PROTOCOL-EXTENSION ::= {
        ...
}

-- Q

-- R

ReportCharacteristics ::= ENUMERATED {
        onDemand,
        periodic,
        ...
}

RequestedSRSTransmissionCharacteristics ::= SEQUENCE {
        numberOfTransmissions    INTEGER (0..500, ...),
        bandwidth                INTEGER (1..100, ...),
        iE-Extensions            ProtocolExtensionContainer { { RequestedSRSTransmissionCharacteristics-
ExtIEs} } OPTIONAL,
        ...
}

RequestedSRSTransmissionCharacteristics-ExtIEs NRPPA-PROTOCOL-EXTENSION ::= {
```

```
...
-- IE contents are FFS pending RAN2
}

ResultRSRP-EUTRA ::= SEQUENCE (SIZE (1.. maxCellReport)) OF ResultRSRP-EUTRA-Item ResultRSRP-EUTRA-Item ::= SEQUENCE {
    pCI-EUTRA              PCI-EUTRA,
    eARFCN                 EARFCN,
    cGI-EUTRA              CGI-EUTRA OPTIONAL,
    valueRSRP-EUTRA        ValueRSRP-EUTRA,
    iE-Extensions          ProtocolExtensionContainer { { ResultRSRP-EUTRA-Item-ExtIEs} } OPTIONAL,
    ...
}

ResultRSRP-EUTRA-Item-ExtIEs NRPPA-PROTOCOL-EXTENSION ::= {
    ...
}

ResultRSRQ-EUTRA ::= SEQUENCE (SIZE (1.. maxCellReport)) OF ResultRSRQ-EUTRA-Item ResultRSRQ-EUTRA-Item ::= SEQUENCE {
    pCI-EUTRA              PCI-EUTRA,
    eARFCN                 EARFCN,
    cGI-UTRA               CGI-EUTRA OPTIONAL,
    valueRSRQ-EUTRA        ValueRSRQ-EUTRA,
    iE-Extensions          ProtocolExtensionContainer { { ResultRSRQ-EUTRA-Item-ExtIEs} } OPTIONAL,
    ...
}

ResultRSRQ-EUTRA-Item-ExtIEs NRPPA-PROTOCOL-EXTENSION ::= {
    ...
}

ResultGERAN ::= SEQUENCE (SIZE (1.. maxGERANMeas)) OF ResultGERAN-Item

ResultGERAN-Item ::= SEQUENCE {
    bCCH                   BCCH,
    physCellIDGERAN        PhysCellIDGERAN,
    rSSI                   RSSI,
    iE-Extensions          ProtocolExtensionContainer { { ResultGERAN-Item-ExtIEs} } OPTIONAL,
    ...
}

ResultGERAN-Item-ExtIEs NRPPA-PROTOCOL-EXTENSION ::= {
    ...
}

ResultUTRAN ::= SEQUENCE (SIZE (1.. maxUTRANMeas)) OF ResultUTRAN-Item

ResultUTRAN-Item ::= SEQUENCE {
    uARFCN                 UARFCN,
    physCellIDUTRAN        CHOICE {
        physCellIDUTRA-FDD     PhysCellIDUTRA-FDD,
        physCellIDUTRA-TDD     PhysCellIDUTRA-TDD
    },
    uTRA-RSCP              UTRA-RSCP OPTIONAL,
    uTRA-EcN0              UTRA-EcN0 OPTIONAL,
    iE-Extensions          ProtocolExtensionContainer { { ResultUTRAN-Item-ExtIEs} } OPTIONAL,
```

```
...
}

ResultUTRAN-Item-ExtIEs NRPPA-PROTOCOL-EXTENSION ::= {
    ...
}

RSSI ::= INTEGER (0..63, ...)

-- S

SRSConfiguration ::= SEQUENCE {
-- IE contents are FFS pending RAN2
    ...
}

SFNInitialisationTime-EUTRA ::= BIT STRING (SIZE (64))

SSID ::= OCTET STRING (SIZE(1..32))

-- T

TAC ::= OCTET STRING (SIZE(3))

TDD-Config-EUTRA-Item ::= SEQUENCE {
        subframeAssignment          ENUMERATED { sa0, sa1, sa2, sa3, sa4, sa5, sa6, ... },
        iE-Extensions               ProtocolExtensionContainer { { TDD-Config-EUTRA-Item-Item-ExtIEs } } OPTIONAL,
    ...
}

TDD-Config-EUTRA-Item-Item-ExtIEs NRPPA-PROTOCOL-EXTENSION ::= {
    ...
}

TP-ID-EUTRA ::= INTEGER (0..4095, ...)

TP-Type-EUTRA ::= ENUMERATED { prs-only-tp, ... }

TypeOfError ::= ENUMERATED {
        not-understood,
        missing,
        ...
}

-- U

UARFCN ::= INTEGER (0..16383, ...)

UTRA-EcN0 ::= INTEGER (0..49, ...)

UTRA-RSCP ::= INTEGER (-5..91, ...)

UL-RTOAMeasurement ::= SEQUENCE {
-- IE contents are FFS pending RAN2
    ...
}

-- V
```

```
ValueRSRP-EUTRA ::= INTEGER (0..97, ...)

ValueRSRQ-EUTRA ::= INTEGER (0..34, ...)

-- W

WLANMeasurementQuantities ::= SEQUENCE (SIZE (0.. maxNoMeas)) OF ProtocolIE-Single-Container {
{WLANMeasurementQuantities-ItemIEs} }

WLANMeasurementQuantities-ItemIEs NRPPA-PROTOCOL-IES ::= {
        { ID id-WLANMeasurementQuantities-Item      CRITICALITY reject      TYPE
WLANMeasurementQuantities-Item PRESENCE mandatory}}

WLANMeasurementQuantities-Item ::= SEQUENCE {
        wLANMeasurementQuantitiesValue              WLANMeasurementQuantitiesValue,
        iE-Extensions                               ProtocolExtensionContainer { {
WLANMeasurementQuantitiesValue-ExtIEs} } OPTIONAL,
        ...
}

WLANMeasurementQuantitiesValue-ExtIEs NRPPA-PROTOCOL-EXTENSION ::= {
        ...
}

WLANMeasurementQuantitiesValue ::= ENUMERATED {
        wlan,
        ...
}

WLANMeasurementResult ::= SEQUENCE (SIZE (1..maxNoMeas)) OF WLANMeasurementResult-Item WLANMeasurementResult-Item ::= SEQUENCE {
        wLAN-RSSI           WLAN-RSSI,
        sSID                SSID                    OPTIONAL,
        bSSID               BSSID                   OPTIONAL,
        hESSID              HESSID                  OPTIONAL,
        operatingClass      WLANOperatingClass      OPTIONAL,
        countryCode         WLANCountryCode         OPTIONAL,
        wLANChannelList     WLANChannelList         OPTIONAL,
        wLANBand            WLANBand                OPTIONAL,
        iE-Extensions       ProtocolExtensionContainer { { WLANMeasurementResult-Item-ExtIEs } }
        OPTIONAL,
        ...
}

WLANMeasurementResult-Item-ExtIEs   NRPPA-PROTOCOL-EXTENSION ::= {
        ...
}

WLAN-RSSI ::= INTEGER (0..141, ...)

WLANBand ::= ENUMERATED {band2dot4, band5, ...}

WLANChannelList ::= SEQUENCE (SIZE (1..maxWLANchannels)) OF WLANChannel

WLANChannel ::= INTEGER (0..255)

WLANCountryCode ::= ENUMERATED {
        unitedStates,
        europe,
``` japan,
        global,
        ...
}

WLANOperatingClass ::= INTEGER (0..255)

-- X

-- Y

-- Z

END
-- ASN1STOP

NEXT CHANGE
9.3.7 Constant definitions
-- ASN1START
-- **************************************************************
--
-- Constant definitions
--
-- **************************************************************

NRPPA-Constants {
itu-t (0) identified-organization (4) etsi (0) mobileDomain (0)
ngran-access (22) modules (3) nrppa (4) version1 (1) nrppa-Constants (4) }

DEFINITIONS AUTOMATIC TAGS ::=

BEGIN

IMPORTS

ProcedureCode,
    ProtocolIE-ID
FROM NRPPA-CommonDataTypes;

-- **************************************************************
--
-- Elementary Procedures
--
-- ************************************************************** id-errorIndication
  ProcedureCode ::= 0
id-privateMessage
  ProcedureCode ::= 1
id-e-CIDMeasurementInitiation                 ProcedureCode ::= 2
id-e-CIDMeasurementFailureIndication             ProcedureCode ::= 3
id-e-CIDMeasurementReport
  ProcedureCode ::= 4
id-e-CIDMeasurementTermination                ProcedureCode ::= 5
id-oTDOAInformationExchange
  ProcedureCode ::= 6
id-positioningInformationExchange                ProcedureCode ::= a id-positioningInformationUpdate             ProcedureCode ::= b
id-Measurement         ProcedureCode ::= c
id-MeasurementReport         ProcedureCode ::= d
id-MeasurementUpdate         ProcedureCode ::= e
id-MeasurementAbort         ProcedureCode ::= f
id-MeasurementFailureIndication             ProcedureCode ::= g -- ************************************************************
--
-- Lists
--
-- ************************************************************

| | |
|---|---|
| maxNrOfErrors | INTEGER ::= 256 |
| maxCellinRANnode | INTEGER ::= 3840 |
| maxNoMeas | INTEGER ::= 63 |
| maxCellReport | INTEGER ::= 9 |
| maxnoOTDOAtypes | INTEGER ::= 63 |
| maxServCell | INTEGER ::= 5 |
| maxGERANMeas | INTEGER ::= 8 |
| maxUTRANMeas | INTEGER ::= 8 |
| maxWLANchannels | INTEGER ::= 16 |
| maxnoFreqHoppingBandsMinusOne | INTEGER ::= 7 |

-- ************************************************************
--
-- IEs
--
-- ************************************************************ id-Cause         ProtocolIE-ID ::= 0
id-CriticalityDiagnostics             ProtocolIE-ID ::= 1
id-LMF-UE-Measurement-ID             ProtocolIE-ID ::= 2
id-ReportCharacteristics             ProtocolIE-ID ::= 3
id-MeasurementPeriodicity             ProtocolIE-ID ::= 4
id-MeasurementQuantities             ProtocolIE-ID ::= 5
id-RAN-UE-Measurement-ID             ProtocolIE-ID ::= 6
id-E-CID-MeasurementResult             ProtocolIE-ID ::= 7
id-OTDOACells         ProtocolIE-ID ::= 8
id-OTDOA-Information-Type-Group             ProtocolIE-ID ::= 9
id-OTDOA-Information-Type-Item             ProtocolIE-ID ::= 10
id-MeasurementQuantities-Item             ProtocolIE-ID ::= 11
id-RequestedSRSTransmissionCharacteristics             ProtocolIE-ID ::= 12
id-Cell-Portion-ID             ProtocolIE-ID ::= 14

| | |
|---|---|
| id-OtherRATMeasurementQuantities | ProtocolIE-ID ::= 15 |
| id-OtherRATMeasurementQuantities-Item | ProtocolIE-ID ::= 16 |
| id-OtherRATMeasurementResult | ProtocolIE-ID ::= 17 |
| id-WLANMeasurementQuantities | ProtocolIE-ID ::= 19 |
| id-WLANMeasurementQuantities-Item | ProtocolIE-ID ::= 20 |
| id-WLANMeasurementResult | ProtocolIE-ID ::= 21 |
| id-TDD-Config-EUTRA-Item | ProtocolIE-ID ::= 22 |
| id-SRSConfiguration | ProtocolIE-ID ::= x |
| id-UL-RTOAMeasurement | ProtocolIE-ID ::= y |

END
-- ASN1STOP

END OF CHANGES

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

AD Assistance Data
SSB Synchronization Signal Block
NR New Radio
OTDOA Observed Time Difference of Arrival
PRS Positioning Reference Signal
CSI-RS Channel State Information Reference Signal
RSTD Reference Signal Time Difference
SIB System Information Block
LOS Line of Sight
NLOS Non-Line of Sight
RE Resource Element
SINR Signal to Interference Noise Ratio
SNR Signal to Noise Ratio
TOA Time of Arrival
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
OCNG OFDMA Channel Noise Generator
OFDM Orthogonal Frequency Division Multiplexing
OFDMA Orthogonal Frequency Division Multiple Access
OSS Operations Support System
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
SCH Synchronization Channel
SCell Secondary Cell
SDU Service Data Unit
SFN System Frame Number
SGW Serving Gateway
SI System Information
SON Self Optimized Network
SS Synchronization Signal
SSS Secondary Synchronization Signal
TDD Time Division Duplex
TDOA Time Difference of Arrival
TSS Tertiary Synchronization Signal
TTI Transmission Time Interval
UE User Equipment
UL Uplink
UMTS Universal Mobile Telecommunication System
USIM Universal Subscriber Identity Module UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method for configuring uplink sounding reference signals (UL SRS), the method comprising:
receiving radio resource information relating to radio resources that can be applied for UL SRS by a wireless device, wherein the radio resource information is received from the base station serving the wireless device and comprises Downlink Control Indicator (DCI) code points; and
providing, to a base station serving the wireless device, a notification relating to triggering aperiodic UL SRS for the wireless device, wherein the notification relating to triggering aperiodic uplink SRS comprises preferred DCI code points associated with uplink SRS configurations.

2. The method of claim 1, wherein the notification relating to triggering aperiodic uplink SRS comprises information on at least one of: a bandwidth required for uplink SRS; a number of symbols required for uplink signalling; and a resource element density required for uplink SRS transmission.

3. The method of claim 1, wherein the method comprises determining a UL SRS configuration suitable for the wireless device, prior to providing the notification relating to triggering aperiodic uplink SRS to the base station serving the wireless device.

4. The method of claim 3, wherein the UL SRS configuration suitable for the wireless device is determined using an SRS-quality metric.

5. The method of claim 4, wherein the SRS-quality metric is associated with at least one of: UL SRS transmission power; UL SRS transmission bandwidth; and number of SRS symbols or SRS occasions.

6. The method of claim 4, wherein the SRS-quality metric is sent to the base station in the notification relating to triggering aperiodic uplink SRS.

7. A method, in a network node, for configuring uplink sounding reference signals (UL SRS), the method comprising:
receiving a notification relating to triggering aperiodic uplink SRS;
determining an UL SRS configuration for a wireless device;
causing the UL SRS configuration to be transmitted to the wireless device; and
informing a Location Management Function (LMF) of the determined UL SRS configuration.

8. The method of claim 7, wherein the UL SRS configuration is transmitted by DCI.

9. The method of claim 7, further comprising instructing a wireless device receiving the UL SRS configuration to transmit an uplink reference signal at a predetermined transmission start time.

10. The method of claim 9, wherein the predetermined transmission start time is set to allow a delay, DeltaT, and wherein the value of DeltaT is caused to be transmitted to the LMF.

11. The method of claim 9, wherein the predetermined transmission start time is based on at least one of:
a delay in informing reception points for the UL SRS;
ongoing wireless device activity;
whether or not the wireless device can provide multiple UL SRS simultaneously or concurrently; and
wireless device transmission triggering methods.

12. The method of claim 7, further comprising instructing a wireless device receiving the UL SRS configuration to transmit an UL SRS as soon as the wireless device has applied the UL SRS configuration.

13. The method of claim 7, further comprising receiving capability information from the wireless device prior to determining the UL SRS configuration and using the wireless device capability information when determining the UL SRS configuration.

14. The method of claim 7, further comprising sending, to a Location Management Function (LMF), radio resource information relating to radio resources that can be applied for UL SRS by the wireless device, wherein the radio resource information is sent to the LMF by the base station prior to receiving the notification relating to triggering aperiodic uplink SRS.

15. The method of claim 7, wherein the notification relating to uplink signalling comprises preferred configurations for the wireless device served by the base station including DCI code points associated with uplink signal configurations.

16. The method of claim 7, wherein the notification relating to triggering aperiodic uplink SRS comprises an SRS-quality metric for determining a suitable UL SRS configuration for the wireless device, wherein the SRS-quality metric is associated with at least one of: UL SRS transmission power; UL SRS transmission bandwidth; and number of SRS symbols or groups of symbols.

* * * * *